US011685435B2

(12) United States Patent
Myklebust

(10) Patent No.: US 11,685,435 B2
(45) Date of Patent: Jun. 27, 2023

(54) DAMPER UNIT, A DAMPER ASSEMBLY, AND A METHOD FOR MAKING A DAMPER UNIT

(71) Applicant: VIBRACOUSTIC FORSHEDA AB, Forsheda (SE)

(72) Inventor: Erik Myklebust, Forsheda (SE)

(73) Assignee: VIBRACOUSTIC FORSHEDA AB, Forsheda (SE)

(*) Notice: Subject to any disclaimer, the term of this patent is extended or adjusted under 35 U.S.C. 154(b) by 308 days.

(21) Appl. No.: 16/771,416

(22) PCT Filed: Dec. 14, 2018

(86) PCT No.: PCT/EP2018/085028
§ 371 (c)(1),
(2) Date: Jun. 10, 2020

(87) PCT Pub. No.: WO2019/115797
PCT Pub. Date: Jun. 20, 2019

(65) Prior Publication Data
US 2020/0339192 A1  Oct. 29, 2020

(30) Foreign Application Priority Data
Dec. 15, 2017 (EP) ..................... 17207562

(51) Int. Cl.
*B62D 7/22* (2006.01)
*B60Q 5/00* (2006.01)
(Continued)

(52) U.S. Cl.
CPC ............. *B62D 7/222* (2013.01); *B60Q 5/003* (2013.01); *B60R 21/203* (2013.01);
(Continued)

(58) Field of Classification Search
CPC ............. B60R 21/203; B60R 21/2037; B60R 21/2035; B62D 7/222; B60Q 5/003;
(Continued)

(56) References Cited

U.S. PATENT DOCUMENTS 2,951,674 A * 9/1960 Rice ...................... F16F 1/3732
411/510
3,319,918 A * 5/1967 Rapata .................. F16B 37/043
267/141

(Continued)

FOREIGN PATENT DOCUMENTS

DE   196 53 684 A1   6/1998
EP   1 099 604 A2    5/2001
(Continued)

OTHER PUBLICATIONS

International Preliminary Report on Patentability, issued in PCT/EP2018/085028, dated Nov. 20, 2019.
(Continued)

*Primary Examiner* — Robert A. Siconolfi
*Assistant Examiner* — James K Hsiao
(74) *Attorney, Agent, or Firm* — Birch, Stewart, Kolasch & Birch, LLP

(57) ABSTRACT

A damper unit for use in a vibration-reducing assembly for a steering wheel is disclosed. The damper unit includes a slider configured, upon horn activation, to slide on a guide shaft. A damper element made from an elastomeric material is arranged on a first part of the slider. A molded horn spring element is molded directly on a second part of the slider and is configured to exert a spring force on the slider. The damper unit provides a unitary structure providing both a vibration damping function and a horn spring function in one single assembly unit, reducing the number of components to assemble. A vibration-reducing damper assembly (Continued)

including one or more such damper units is also disclosed, as well as a method of making such a damper unit.

22 Claims, 25 Drawing Sheets

(51) Int. Cl.
| | |
|---|---|
| F16F 1/38 | (2006.01) |
| F16F 7/10 | (2006.01) |
| B60R 21/20 | (2011.01) |
| B60R 21/203 | (2006.01) |
| F16F 7/108 | (2006.01) |
| F16F 3/087 | (2006.01) |
| F16F 7/104 | (2006.01) |
| F16F 15/08 | (2006.01) |
| B29C 45/14 | (2006.01) |
| B29K 21/00 | (2006.01) |
| B29L 31/00 | (2006.01) |

(52) U.S. Cl.
CPC ............ *B60R 21/2037* (2013.01); *F16F 1/38* (2013.01); *F16F 1/3842* (2013.01); *F16F 3/0873* (2013.01); *F16F 7/104* (2013.01); *F16F 7/108* (2013.01); *F16F 7/1028* (2013.01); *F16F 15/08* (2013.01); *B29C 45/14336* (2013.01); *B29K 2021/003* (2013.01); *B29L 2031/721* (2013.01); *F16F 2222/08* (2013.01); *F16F 2224/025* (2013.01); *F16F 2224/0208* (2013.01); *F16F 2226/04* (2013.01); *F16F 2226/042* (2013.01); *F16F 2228/04* (2013.01); *F16F 2230/0005* (2013.01); *F16F 2234/02* (2013.01)

(58) Field of Classification Search
CPC .... F16F 7/104; F16F 7/108; F16F 1/38; F16F 15/08; F16F 3/0873; F16F 1/384; F16F 7/1028; F16F 2234/02; F16F 2222/08; F16F 2224/0208; F16F 2228/04; F16F 2226/04; F16F 2226/042; F16F 2230/0005; F16F 2224/025; B29L 2031/721; B29K 2021/003; B29C 45/14336

See application file for complete search history.

(56) References Cited

U.S. PATENT DOCUMENTS

| | | | | |
|---|---|---|---|---|
| 3,756,551 A * | 9/1973 | Bishop | ............... | B60G 11/22 267/141.1 |
| 4,405,272 A * | 9/1983 | Wollar | ............... | F16B 19/1081 411/41 |
| 4,442,367 A * | 4/1984 | Suzuki | ............... | F16F 1/373 310/91 |
| 4,789,763 A * | 12/1988 | Nagata | ............... | B60Q 5/003 200/61.54 |
| 5,333,897 A * | 8/1994 | Landis | ............... | B60R 21/2037 200/61.54 |
| 5,350,190 A * | 9/1994 | Szigethy | ............... | B60R 21/2037 200/61.55 |
| 5,397,206 A * | 3/1995 | Sihon | ............... | F16F 7/00 411/970 |
| 5,447,257 A * | 9/1995 | Dark | ............... | F16K 41/10 222/402.1 |
| 5,508,481 A * | 4/1996 | Williams | ............... | H01H 3/122 200/61.54 |
| 5,639,113 A * | 6/1997 | Goss | ............... | F16B 21/18 411/517 |
| 5,650,600 A * | 7/1997 | Walters | ............... | B60Q 5/003 200/61.54 |
| 6,464,247 B1 * | 10/2002 | Laue | ............... | B62D 7/222 280/728.2 |
| 6,592,141 B1 * | 7/2003 | Dancasius | ............... | B60R 21/2037 280/728.1 |
| 7,246,797 B2 * | 7/2007 | Gustavsson | ............... | F16F 15/022 267/269 |
| 7,322,602 B2 * | 1/2008 | Tsujimoto | ............... | B60R 21/2037 200/61.54 |
| 7,341,273 B2 * | 3/2008 | Massanetz | ............... | B60R 21/2035 280/736 |
| 7,389,977 B1 * | 6/2008 | Fernandez | ............... | F16F 3/087 267/293 |
| 8,286,766 B2 * | 10/2012 | Terada | ............... | B62D 7/222 200/61.55 |
| 8,505,701 B2 * | 8/2013 | Sella | ............... | F16F 7/116 188/379 |
| 8,602,451 B2 * | 12/2013 | James | ............... | B60R 21/2037 200/61.54 |
| 8,794,662 B2 * | 8/2014 | Ishii | ............... | B60R 21/2037 280/728.2 |
| 8,939,466 B2 * | 1/2015 | James | ............... | B60R 21/2037 280/731 |
| 8,950,736 B2 * | 2/2015 | Gustavsson | ............... | F16F 7/108 267/141 |
| 8,985,623 B2 * | 3/2015 | Kondo | ............... | F16F 7/1028 280/731 |
| 9,366,311 B2 * | 6/2016 | Gustavsson | ............... | F16F 7/108 |
| 9,744,922 B2 * | 8/2017 | Ostermeier | ............... | F01N 13/1872 |
| RE47,687 E * | 11/2019 | Umemura | ............... | B62D 7/222 |
| 10,513,238 B2 * | 12/2019 | Von Roden | ............... | B60R 21/272 |
| 2002/0125698 A1 * | 9/2002 | Schutz | ............... | B62D 1/04 280/731 |
| 2004/0012177 A1 * | 1/2004 | Sauer | ............... | B60R 21/2037 280/731 |
| 2004/0100078 A1 * | 5/2004 | Schutz | ............... | B60Q 5/003 280/731 |
| 2006/0197323 A1 * | 9/2006 | Pillsbury | ............... | B60Q 5/003 280/728.2 |
| 2007/0071578 A1 * | 3/2007 | Shinozaki | ............... | F16B 21/186 411/508 |
| 2009/0079168 A1 * | 3/2009 | Umemura | ............... | B60R 21/2035 280/728.2 |
| 2009/0085334 A1 * | 4/2009 | Matsu | ............... | B60R 21/2037 280/732 |
| 2009/0218739 A1 * | 9/2009 | Terada | ............... | B60R 21/2037 267/136 |
| 2010/0066062 A1 * | 3/2010 | Suzuki | ............... | B60R 21/2037 200/61.55 |
| 2012/0306119 A1 | 12/2012 | Boes et al. | | |
| 2014/0131982 A1 * | 5/2014 | Ishii | ............... | B60R 21/2037 280/728.2 |
| 2016/0031480 A1 * | 2/2016 | Ishii | ............... | B62D 7/222 280/731 |
| 2017/0144594 A1 * | 5/2017 | Obayashi | ............... | B62D 1/04 |
| 2017/0297604 A1 * | 10/2017 | Raikar | ............... | F16F 7/108 |

FOREIGN PATENT DOCUMENTS

| | | |
|---|---|---|
| EP | 2 085 290 A1 | 8/2009 |
| EP | 2 530 352 A2 | 12/2012 |
| JP | 2016-64808 A | 4/2016 |
| KR | 10-2015-0137580 A | 12/2015 |
| WO | WO 01/92752 A1 | 12/2001 |
| WO | WO 2008/127157 A1 | 10/2008 |
| WO | WO 2013/167524 A1 | 11/2013 |

OTHER PUBLICATIONS

International Search Report, issued in PCT/EP2018/085028, dated Mar. 19, 2019.
Written Opinion of the International Searching Authority, issued in PCT/EP2018/085028, dated Mar. 19, 2019.

* cited by examiner

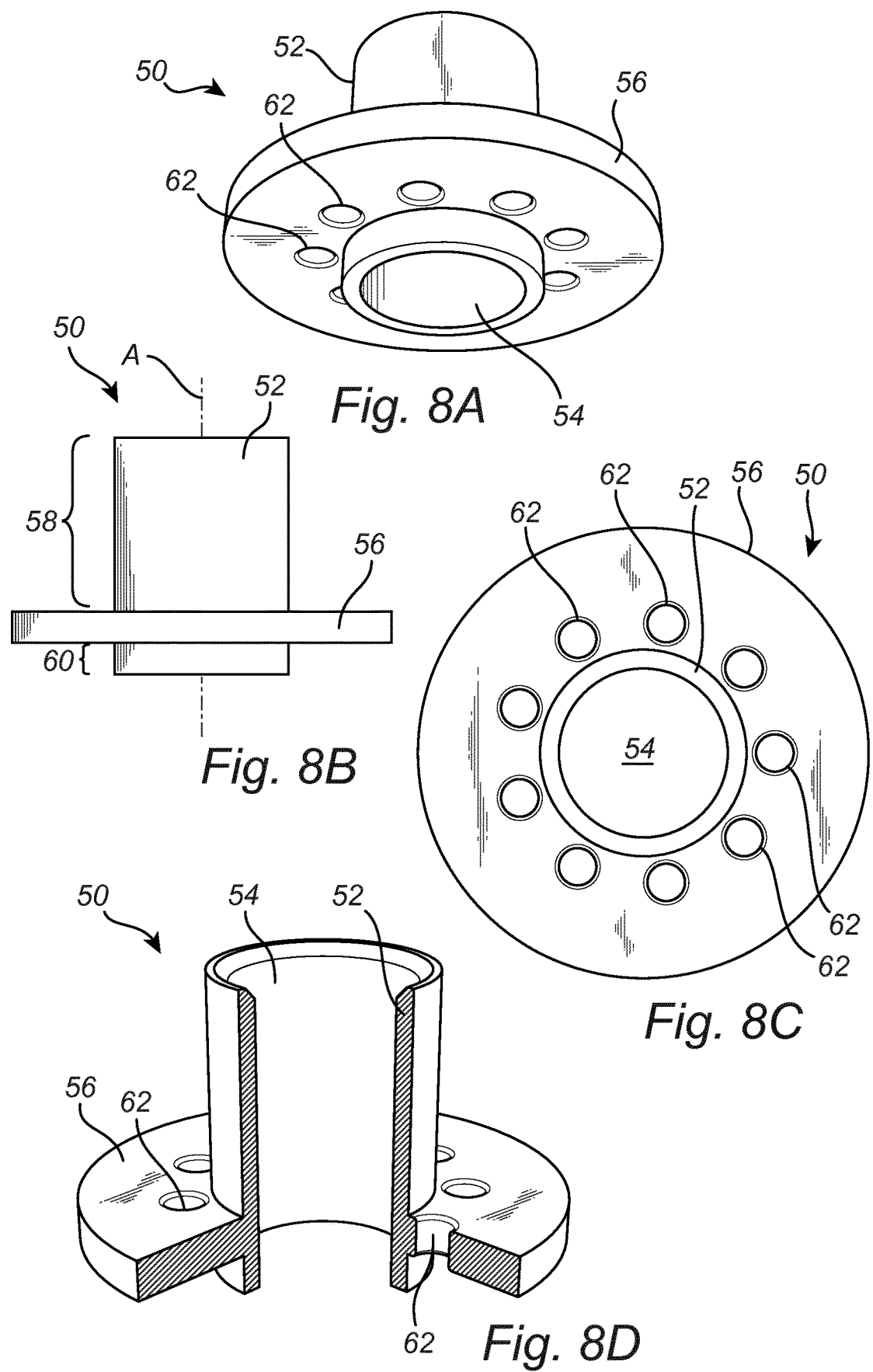

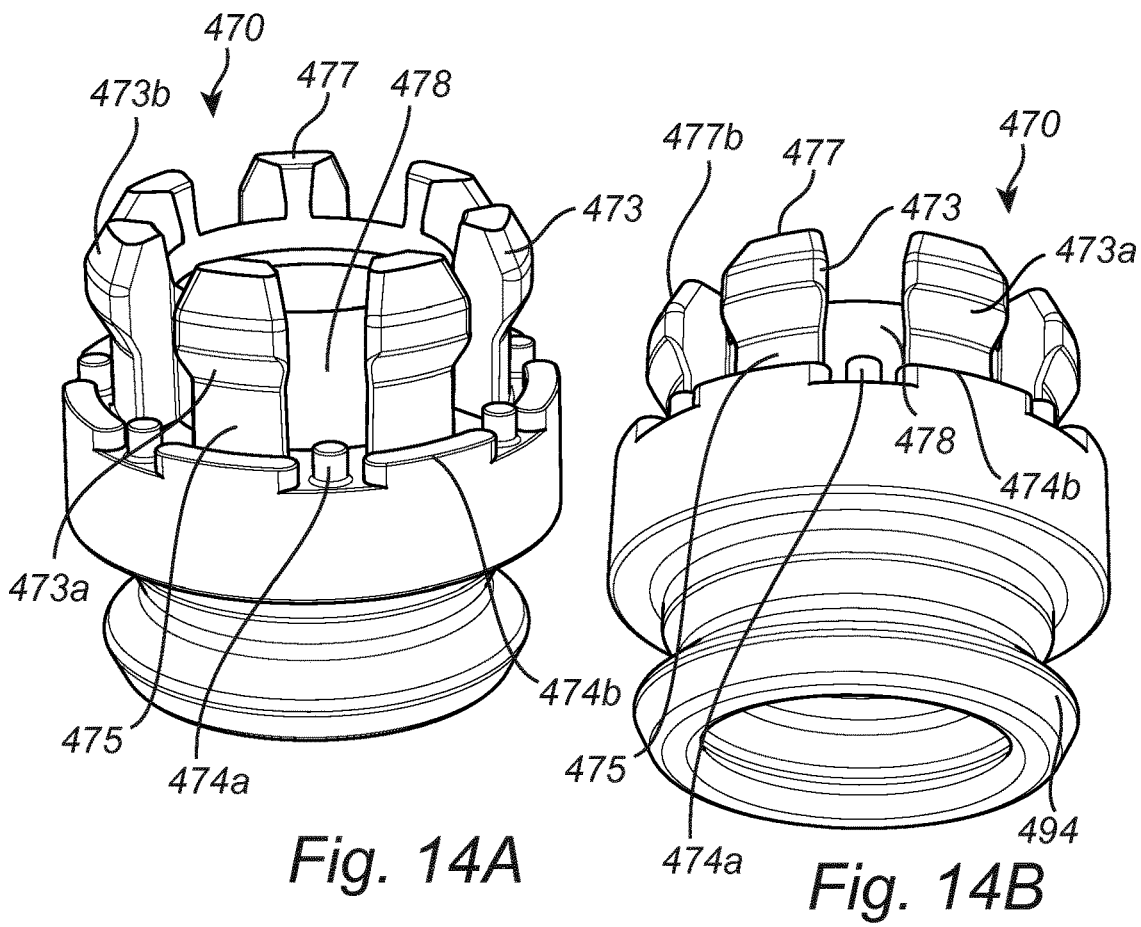
Fig. 14A
Fig. 14B
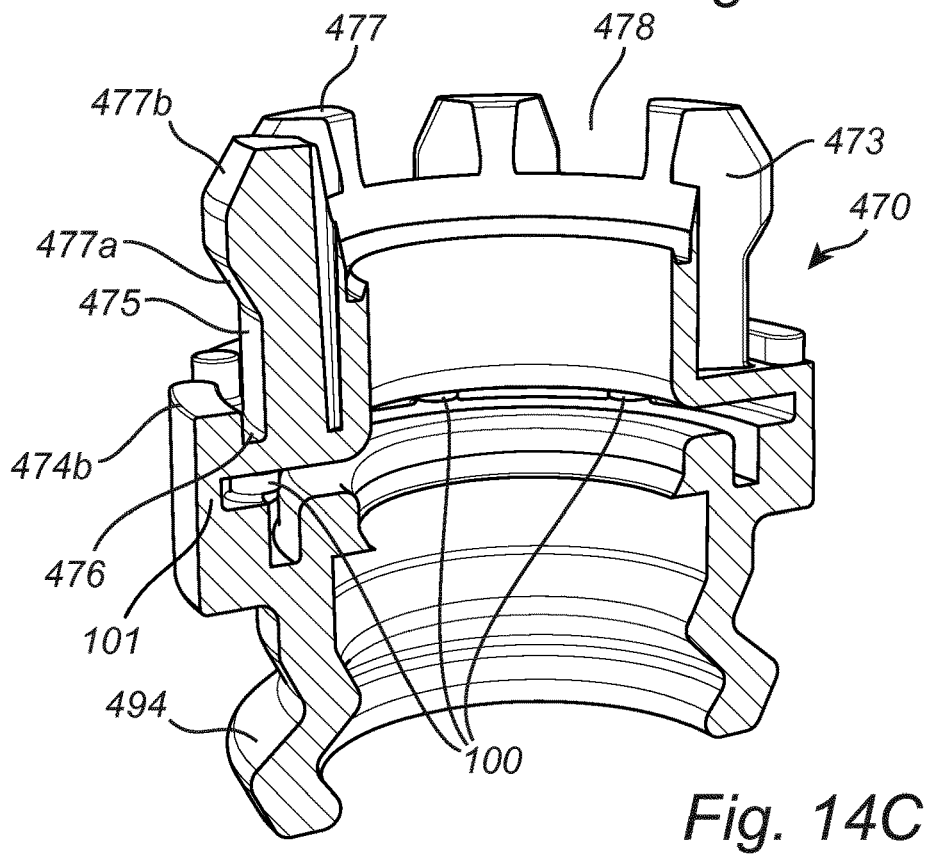
Fig. 14C

DAMPER UNIT, A DAMPER ASSEMBLY, AND A METHOD FOR MAKING A DAMPER UNIT

TECHNICAL FIELD

The present disclosure generally relates to the field of frequency-tuned dampers for motor vehicles. A damper unit for use in a vibration-reducing assembly for a steering wheel is disclosed. A vibration-reducing damper assembly including one or more such damper units is also disclosed, as well as a method of making such a damper unit.

BACKGROUND

The function of frequency-tuned vibration dampers, also termed tuned mass dampers, dynamic dampers or vibration absorbers, is based on a dampened spring-mass system which counteracts and reduces vibrations in a structure or surface to which the damper is connected by using one or more elastic damper elements for transferring vibrations from a vibrating structure to at least one mass which is caused to vibrate out of phase such as to dampen the vibrations. WO 01/92752 A1, WO 2013/167524 A1, and WO 2008/127157 A1 disclose examples of frequency-tuned vibration dampers.

In the automotive industry, some steering wheels are provided with frequency-tuned vibration dampers for reducing steering wheel vibrations caused by vibrations from the road and engine being transferred to the steering wheel. In such damper structures, the weight of an airbag module may be used as part of the weight of the mass in the spring-mass system. Also, steering wheels are generally provided with a horn activation mechanism by which a driver may activate a horn of the vehicle. Horn activation mechanisms of mechanical type typically comprise one or more metal spiral springs, referred to as horn springs, for returning the horn activation mechanism to its normal state after a horn activation. Electronic horn activation mechanisms without horn springs are also available.

EP 2 085 290 discloses an example of a prior art vibration-reducing damper structure for a steering wheel, including an elastic damper element arranged on a slider which is slidably mounted on a bolt shaft. Vibrations in the steering wheel are transferred by the elastic damper element to the airbag assembly for dampening purposes. During horn activation, the slider may slide along the bolt shaft. A conventional spiral spring is placed on the bolt shaft and is compressed upon horn activation for bringing the slider back to its normal position when the horn activation is terminated. One drawback of this prior art is that is that the assembly of the overall structure is complicated and time consuming, increasing manufacturing time and cost.

U.S. Pat. No. 8,985,623 B2 discloses an alternative damper structure for a steering wheel. The overall operation is similar to the one in disclosed in EP 2 085 290 mentioned above, but the elastic element is encapsulated in a rigid multi-part protector structure. The protector is slidably arranged on a shaft and is biased by a horn spring towards the non-activated position of the horn activation mechanism. This prior-art solution has essentially the same drawbacks, and actually requires additional cost and time for manufacturing the protector.

SUMMARY OF INVENTION

In the light of the above, it is an object of the present inventive concept to address the above-mentioned disadvantages of the prior art and, to this end, provide (i) a damper unit for use in a vibration-reducing assembly for a steering wheel, (ii) a vibration-reducing assembly for dampening vibrations in a steering wheel, and (iii) a method for manufacturing such a damper unit.

According to a first aspect of the inventive concept, there is provided a damper unit for use in a vibration-reducing assembly for a steering wheel, said damper unit comprising:
  a slider having a central bore extending along an axis, said slider being configured, upon horn activation on the steering wheel, to slide in the direction of said axis on a guide shaft received in said bore;
  a damper element which is made from an elastomeric material and is arranged on a first part of the slider; and
  a molded horn spring element which made from an elastomeric material and comprises a horn spring part and an attachment part molded in one piece with each other, wherein the attachment part of the horn spring element is molded on a second part of the slider, and wherein the horn spring part is configured to exert a force on the slider in the direction of the axis before and upon horn activation on the steering wheel.

According to a second aspect of the inventive concept, there is provided a vibration-reducing assembly for dampening vibrations in a steering wheel, said assembly comprising:
  a base structure which is fixed to the steering wheel and presents vibrations to be dampened;
  a guide shaft fixed to the base structure;
  a damper unit as claimed in any of claims 1 to 8, wherein the guide shaft is slidably received in the central bore of the slider, and wherein the horn spring part of the damper unit is configured, upon horn activation on the steering wheel, to be compressed in response to the slider moving along the axis of the damper unit towards the base structure; and
  a mass which is supported by the base structure via the damper element of the damper unit for allowing movement of the mass perpendicular to said axis;
  wherein the damper element of the damper unit is configured to transfer vibrations, directed perpendicular to said axis, from the steering wheel to the mass; and
  wherein the damper element and the mass are configured to operate as a spring-mass system forming a frequency-tuned dynamic damper for dampening said vibrations in the base structure and the steering wheel.

According to a third aspect of the inventive concept, there is provided a method for making a damper unit, comprising:
  providing a slider having a central bore extending along an axis of the damper unit;
  providing a damper element which is made from an elastomeric material on a first part of the slider;
  molding a horn spring element from an elastomeric material, said molded horn spring element comprising a horn spring part and an attachment part molded in one piece with each other, wherein the attachment part is molded on a second part of the slider.

The inventive concept presents at least the following advantages over the prior-art:
  A main advantage obtained by the inventive concept is that the number of components to manufacture, manage and assemble is reduced by using the inventive damper unit. During assembly, the inventive damper unit is already provided with the molded horn spring element. Thereby, no separate spiral horn spring has to be handled during assembly since the horn spring is already in place as an integral component of the damper unit. The horn spring mechanism is directly and automatically obtained upon mounting the slider on the guide shaft.

In preferred embodiments, the elastomeric damper element is also already provided on the damper unit when the unit is to be mounted in the assembly.

The horn plate can be quickly and easily connected to the base structure by one or more damper units, wherein each damper unit automatically provides—as a direct result of mounting the unit—both a vibration dampening function and a horn spring function without any need of handling or assembling a separate damping element or a separate horn spring.

In embodiments where also the damper element is molded on the slider, it is possible to manufacture a multi-function unitary damper unit by molding the damper element and the horn spring element in one piece with each other on the slider in one single molding step. The unitary damper unit—including slider plus damper element plus horn spring—will present a slider function, a vibration damping function and a horn spring function By molding the elastomeric horn spring element on the slider, it is possible to both manufacture the horn spring and to bond the horn spring to the slider in one single molding operation.

By molding the horn spring element on the slider, the quality of the final product may be increased since no separate alignment and mounting of the horn spring is needed.

By using a damper unit according to the inventive concept it is possible to perform the assembly essentially from one side only of the horn plate, compared to prior art solutions where the slider is inserted from one side of the horn plate and the damper element and locking means are assembled from the opposite side of the horn plate.

The above and further advantages will become apparent from the following disclosure.

Preferred embodiments of the inventive concept are set out in the dependent claims.

The molded horn spring part is configured to exert a force on the slider in the direction of the axis before and upon horn activation on the steering wheel. When the damper unit is installed in the assembly, the molded horn spring part is pre-compressed, such that it is configured to exert a biasing force on the slider in the non-activated state also of the horn activation mechanism. Upon horn activation, the horn spring part is further compressed. The reason for installing the horn spring part in a biased state is to ensure that a fully developed horn spring force is available essentially immediately upon horn activation by the driver.

In preferred embodiments, the horn spring element may be bonded to the slider. This has the advantage that a ready-to-assemble damper unit is provided in which the horn spring element molded on the slider is bonded to the slider and thus held in correct position on the slider when the damper unit is mounted in the vibration-reducing assembly. Different bonding techniques may be used, individually or in combination. One bonding technique includes frictional bonding. A frictional bonding may in some embodiments be obtained as a result of a post-molding shrinking of the elastomeric material around the slider.

In some embodiments, the attachment part of the horn spring element may be mechanically bonded to the slider (although frictional bonding may also be considered a mechanical bonding). In order to establish such a mechanical bonding, the attachment part of the horn spring element may be mechanically bonded to the slider by means of one or more molded locking elements. The molded locking elements may be molded in one piece with the horn spring element. The molded locking elements may be in mechanical locking engagement with associated one or more structures of the slider, such as locking openings in the slider.

In some embodiments, the attachment part of the horn spring element may be chemically bonded to the slider, such as by adhesion (e.g. by using additives and/or primers) or other reaction.

In some embodiments, the attachment part of the horn spring element may be both mechanically bonded and chemically bonded to the slider.

In the present disclosure, when an elastomeric element is stated to be "molded on the slider" is should be interpreted as the relevant element is first of all a molded detail being manufactured by molding. Second, the expression "molded on the slider" is to be interpreted as the relevant element is created/molded directly on the slider, in contrast to prior-art solutions where the relevant element is made as a separate part, such as in the form of a conventional spiral-shaped metal spring made separately from the slider and which mounted in the assembly as a separate part. In preferred embodiments, the elastomeric material includes silicone rubber.

In the present disclosure, the terms "bonding" or "bonded" are to be interpreted as a connection or attachment between the relevant element and the slider preventing the element from falling off from or being easily removed from the slider. The term "bonding" is thus to be interpreted as an attachment or connection ensuring that the relevant element, as an integral part of the damper unit from an assembly perspective, is being held by the bond in its intended position on the slider. In embodiments where an element can easily be removed from the slider or easily fall of from the slider, such as a cylindrical damper element having a central bore in which a guide shaft is received without any mechanical bonding or adhesion acting in the axial direction, the element is not considered to be "bonded" to the slider although radial movement relative to the slider may be restricted.

In the present disclosure, "mechanically bonded" or "mechanical bonding" is to be interpreted as an alternative to "chemical bonding". Mechanically bonding should be interpreted as a non-chemical attachment of the relevant element to the slider, ensuring that the relevant element is mechanically maintained in its intended position on the slider.

In the present disclosure, expressions as "chemically bonded", "chemical bonding", "adhesion" binding or "adhesion" and the like should be interpreted as an alternative to mechanical bonding. Chemical bonding is considered a bonding between molecules. In some embodiments, mechanical and chemical bonding may be used in combination. A preferred chemical bonding may be adhesion bonding rather than glue. Chemical bonding may be provided during molding. In some embodiments, chemical bonding may be obtained by using an overmolding technique with adhesion bonding between similar or related polymers.

In a preferred embodiment of obtaining a mechanical bonding of the horn spring element to the slider, one or more locking elements may be molded in one piece with not only the horn spring element, but with the elastomeric damper element also. Thereby, the elastomeric damper element, the elastomeric horn spring element, and said one or more locking elements are molded in one piece with each other on the slider, forming a unitary molded body mechanically bonded to the slider, and preferably also chemically bonded to the slider. Locking openings in the slider may be formed as through-holes in a radially extending flange on the slider, wherein the damper element and the horn spring element may be arranged on axially opposite sides of the flange, and wherein the locking elements form molded "bridges" between the damper element and the horn spring element, extending through the openings in the flange.

In some embodiments, the slider may comprise a tubular part and a radially extending flange but with no locking openings. A radially extending flange may be in engagement with the attachment part of the molded horn spring element and may give support for spring forces from the horn spring part. A radially extending flange may also be used for giving axial support for the elastomeric damper element on the opposite side of the flange. In preferred embodiments, one single flange may be used for both purposes, although it would be possible to use two flanges. Other designs of protruding elements than a flange are also possible.

In some embodiments, the slider comprises a tubular element and a radially flange which divides the tubular slider element into a first and a second tubular part, wherein the damper element may be arranged on the first tubular part and the horn spring element may be provided on the second tubular part. The attachment part of the horn spring element may be bonded to the flange and/or the second tubular part. The horn spring part of the horn spring element may in some embodiments extend at least in part axially beyond the end of the second tubular part, in order to allow compression of the horn spring part upon horn activation. In other embodiments, the second tubular part may be dispensed with and the attachment part may be bonded directly to the flange, for instance by locking elements as described above.

In some embodiments, the molded horn spring part is at least partly bellows-shaped in order to provide the aimed-at horn spring function. In other embodiments, other horn spring designs may be possible, for instance designs relying at least partly on compression rather than flexing of the elastomeric material.

In preferred embodiments, not only the horn spring part is molded on the slider but also the damper element is molded on the slider, wherein the damper element may optionally be mechanically and/or chemically bonded to the slider. In such embodiments, the horn spring and the damper element are preferably molded in one piece with each other.

As known as such in the prior art, the weight of an airbag assembly in the steering wheel may be preferably be used as part of the mass for the dynamic damping function of the dynamic spring-mass system in order to use a separate dead weight for this purpose. The weight of the horn plate and of further components supported by the horn plate will also contribute to the total weight of the vibrating mass.

In some embodiments of the inventive vibration-reducing assembly, the elastomeric damper element of the damper unit is received in a mounting opening of the horn plate, wherein the damper element presents an outer engagement surface, which is in engagement with an inner engagement surface of a mounting opening of the horn plate for transferring the vibrations. The inner engagement surface may be formed by a sleeve extending from the horn plate for providing an axially extended engagement interface. Such a sleeve may be a sleeve molded on the horn plate. Different designs of the engagement surfaces will be disclosed below.

The inventive vibration-reducing damper assembly comprises at least one, but preferably a plurality of damper units according to the invention. Optionally the damper units may be configured to dampen vibrations in different directions.

BRIEF DESCRIPTION OF THE DRAWINGS

The inventive concept, some non-limiting preferred embodiments, and further advantages of the inventive concept will now be described with reference to the drawings in which:

FIGS. 8A to 8D illustrate a slider of a $1^{st}$ embodiment of a damper unit.

FIGS. 14A to 14C illustrate a unitary elastomeric body of the damper unit according to the $4^{th}$ embodiment.

DETAILED DESCRIPTION OF PREFERRED EMBODIMENTS

The present inventive concept relates in general to the field of frequency-tuned vibration dampers, also referred to as dynamic dampers. Such dampers may be used to dampen vibrations in a vibrating surface or structure, such as a vibrating component like a steering wheel of a motor vehicle. A dynamic vibration damper comprises a mass acting as a vibration body, and at least one elastic damper element. The mass and the least one elastic damper element together provide a dampened spring-mass system, and may be connected to the vibrating structure, optionally by means of an intermediary component.

The weight of the mass, and the stiffness and damping of the elastic damping element are selected to provide a damping effect on the vibrating structure, which can be expected to vibrate at one or more predetermined target frequencies. When the vibrating structure vibrates at a target frequency, the mass is caused to oscillate/resonate at the same frequency as the structure but out of phase, such that the vibration of the structure is substantially dampened. The mass may vibrate with an amplitude substantially greater than the vibration amplitude of the vibrating structure.

The present inventive concept relates to a damper unit for use in such a dynamic damper assembly arranged in a steering wheel of a vehicle for dampening steering wheel vibrations.

1$^{st}$ Embodiment

Figure 1A:
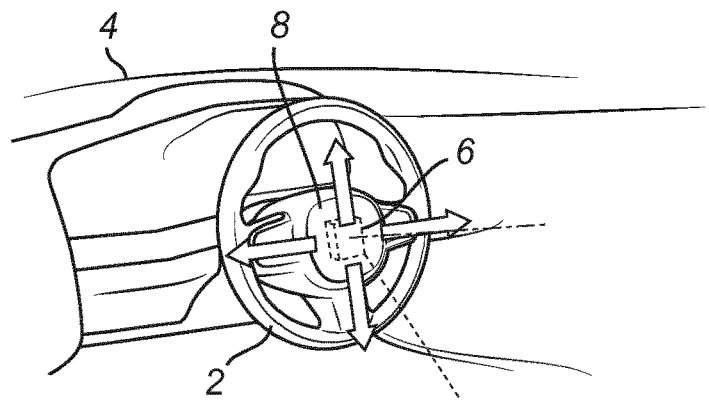
FIG. 1A illustrates a steering wheel of a vehicle.

FIG. 1A illustrates a steering wheel 2 in a motor vehicle 4. Vibrations from the road and the engine may be transferred to the steering wheel 2. These steering wheel vibrations may be perpendicular to the steering column, as indicated by up-down and left-right arrows. The steering wheel 2 is provided with a vibration-reducing assembly 6, which is schematically indicated by a dashed box inside the steering wheel 2 and which is configured to dynamically dampen at least some of the steering wheel vibrations.

As known in the art, the steering wheel 2 is also provided with a horn activation mechanism for activating a horn (not shown) of the vehicle 4. To this end, a horn activation pad 8 is arranged in the center of the steering wheel 2 to be pressed by the driver upon horn activation. When the driver releases the horn activation pad 8, the horn activation mechanism returns to its non-activated or initial state by means of one or more horn springs. In the illustrated embodiment, the horn activation mechanism is of mechanical type. There exist horn activation mechanisms of electronic design also, not including horn springs.

Figure 1B:
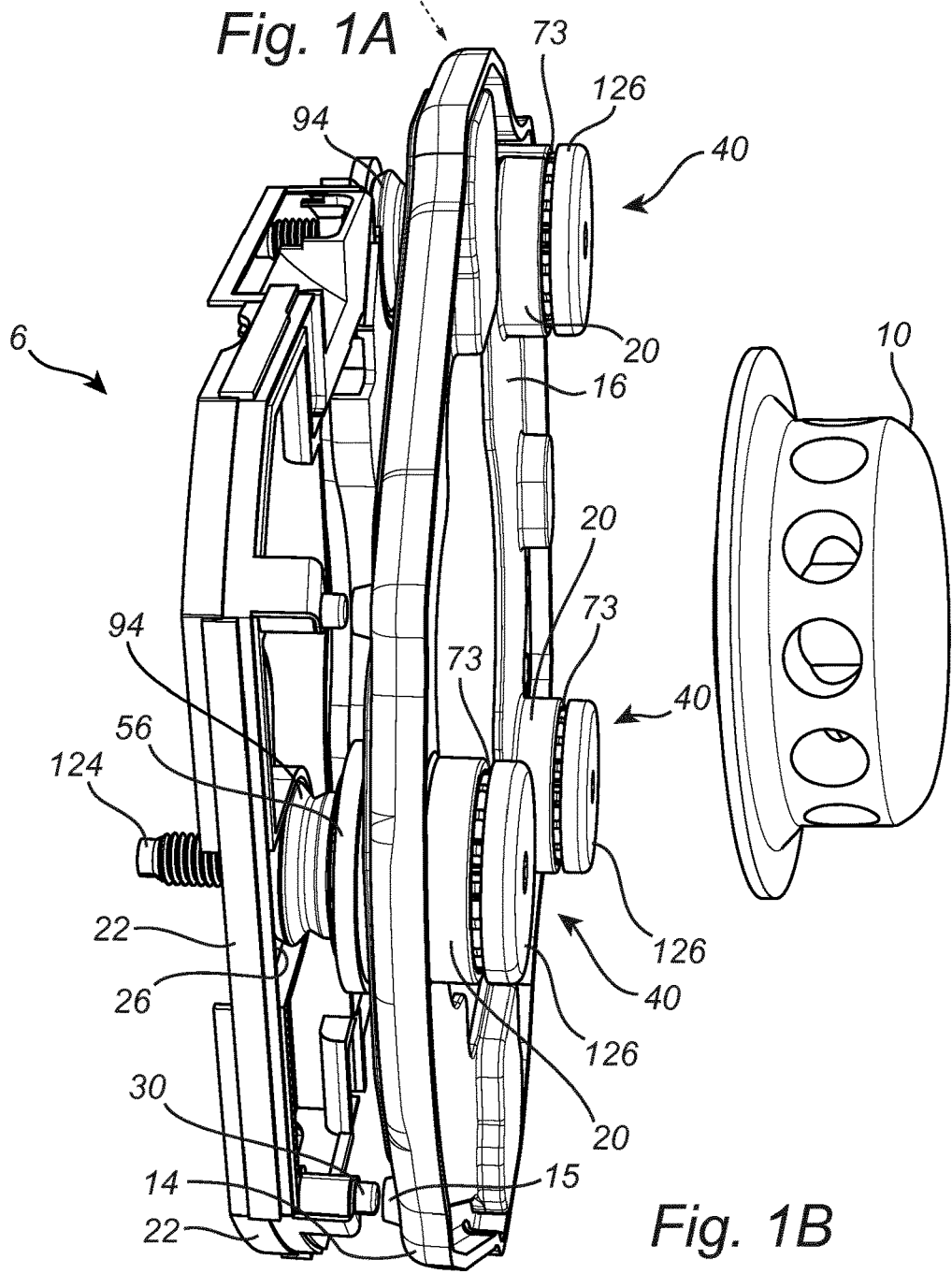
FIG. 1B illustrates main parts of a vibration-reducing assembly.

Furthermore, an airbag assembly may be arranged inside the steering wheel 2 under the horn activation pad 8. FIG. 1B schematically shows a part 10 of a gas generator of an airbag assembly. In the present embodiment, the weight of the airbag assembly is used as at least part of the total weight of the mass used in the vibration-reducing spring-mass system. Thereby, the use of separate deadweights for this purpose may be avoided or substantially reduced.

The vibration-reducing assembly 6 inside the steering wheel 2 is arranged on and supported by a base structure or armature 12 fixed to the steering wheel 2. The vibrations in the steering wheel 2 are thus present in the base structure 12 also, as indicated by vibrations V in FIG. 7 perpendicular to the steering column. The vibration-reducing assembly 6 comprises a horn plate 14 on which the airbag assembly is mounted, including the gas generator and the airbag. In a preferred embodiment, the horn plate 14 is made of metal and is optionally provided with a plastic cover made of a relatively rigid plastic material molded on the horn plate 14, including a top cover 16 and a bottom cover 18. The horn plate 14 is provided with three openings, each arranged to receive part of a damper unit 40 as will be described below. In the illustrated embodiment, a cylindrical sleeve 20 is arranged around each opening in the horn plate 14 and extends above the plane of the horn plate 14. The sleeves 20 may by molded in one piece with the plastic cover 16, 18, thus being rigidly connected to the horn plate 14. In other embodiments, the sleeves 20 may be dispensed with.

Figure 2:
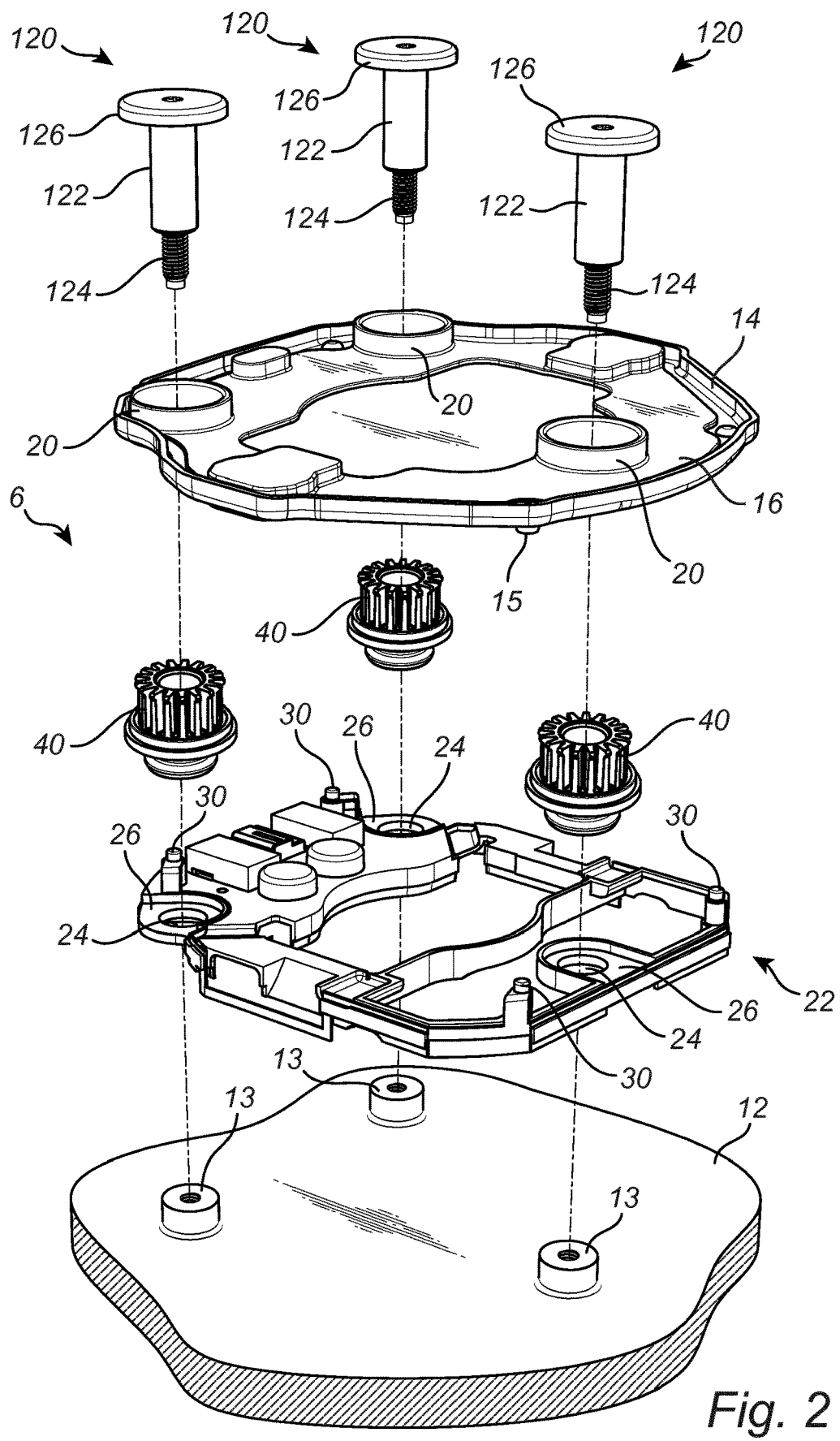
FIG. 2 is an exploded view of a vibration-reducing assembly.
Figure 3:
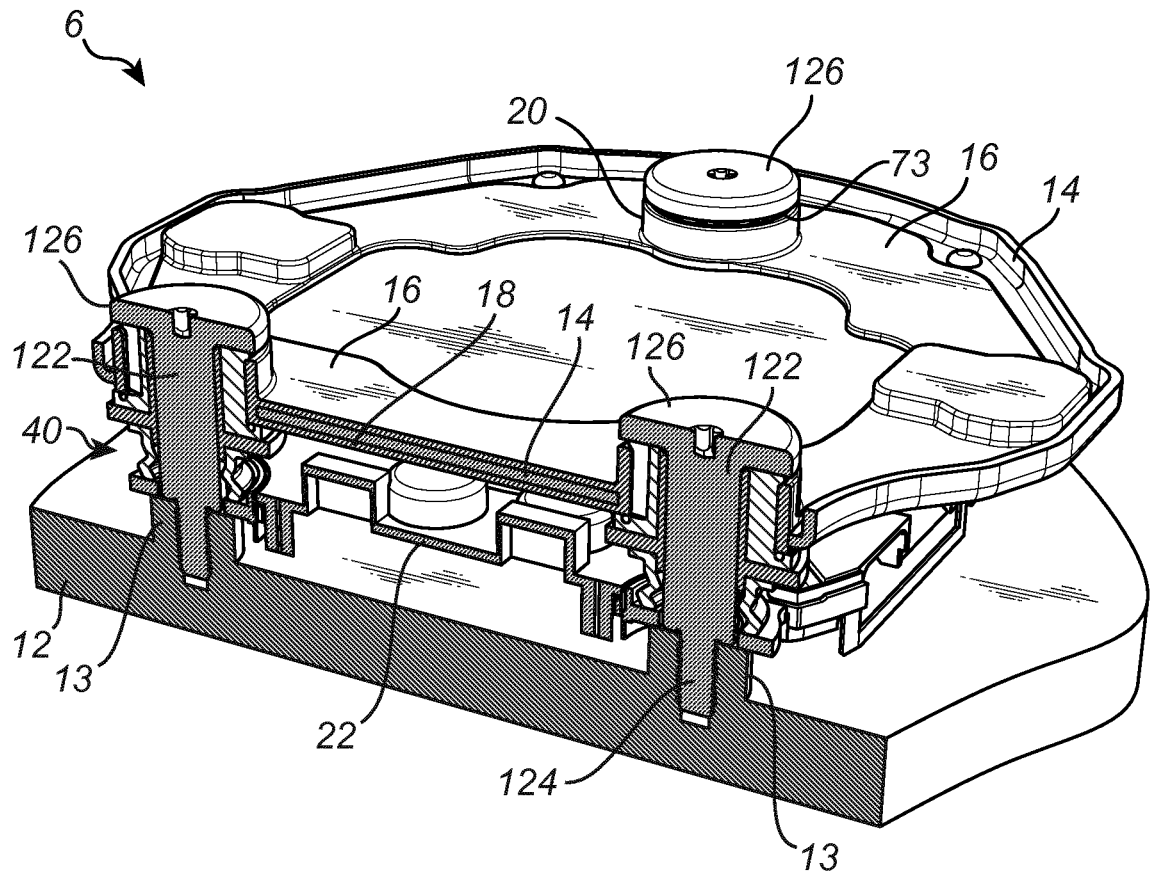
FIGS. 3 and 4 are sectional views of the assembly in FIG. 1B.
Figure 4:
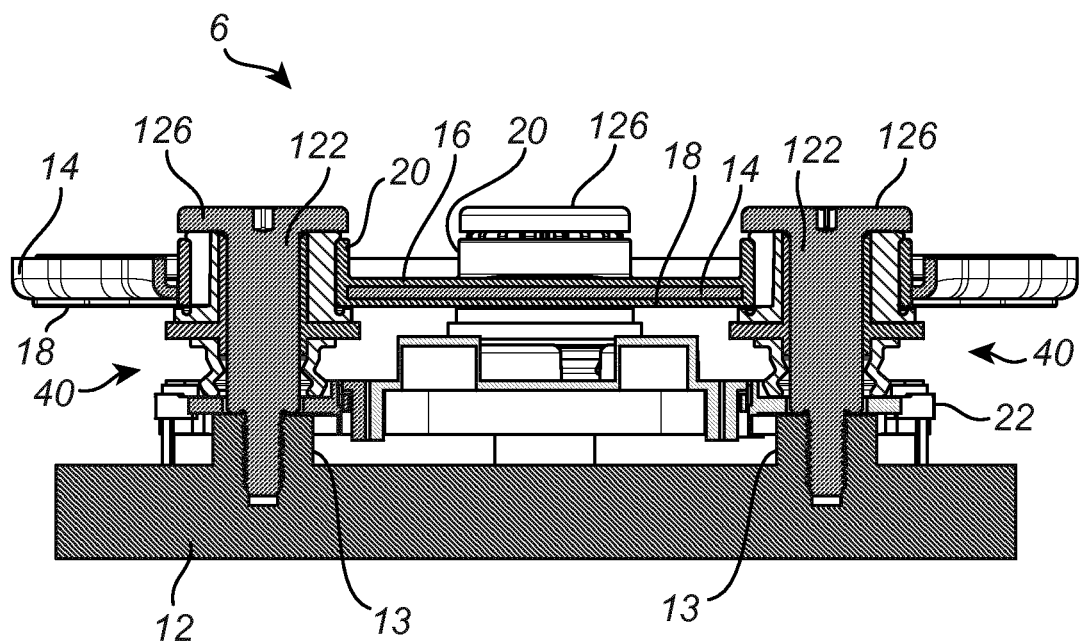

As shown in FIG. 2, the base structure 12 may comprise three support projections 13, projecting towards the horn plate 14 and each provided with a threaded bolt hole. A separate bracket 22 is supported on the support projections 13. The bracket 22 has a through opening 24 aligned with each support projection 13. Around each through opening 24, the bracket 22 presents a horn spring support surface 26 facing the horn plate 14, and on the opposite side a bracket support surface 28 facing the base support 12. In the assembled state (FIG. 7), the bracket 22 is supported at the bracket support surfaces 28 by the support projections 13.

Figure 5:
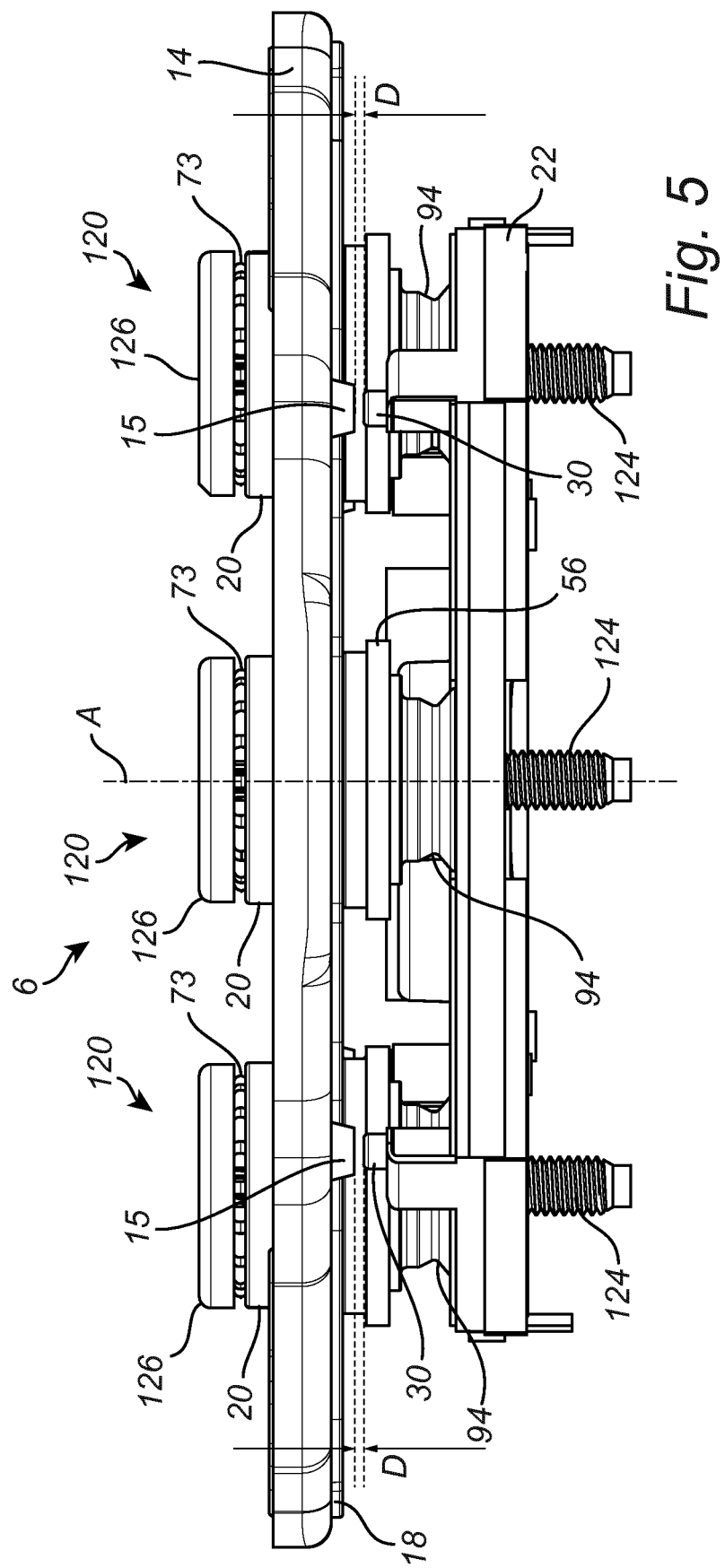
FIG. 5 is a side view of the assembly in FIG. 1B.
Figure 6:
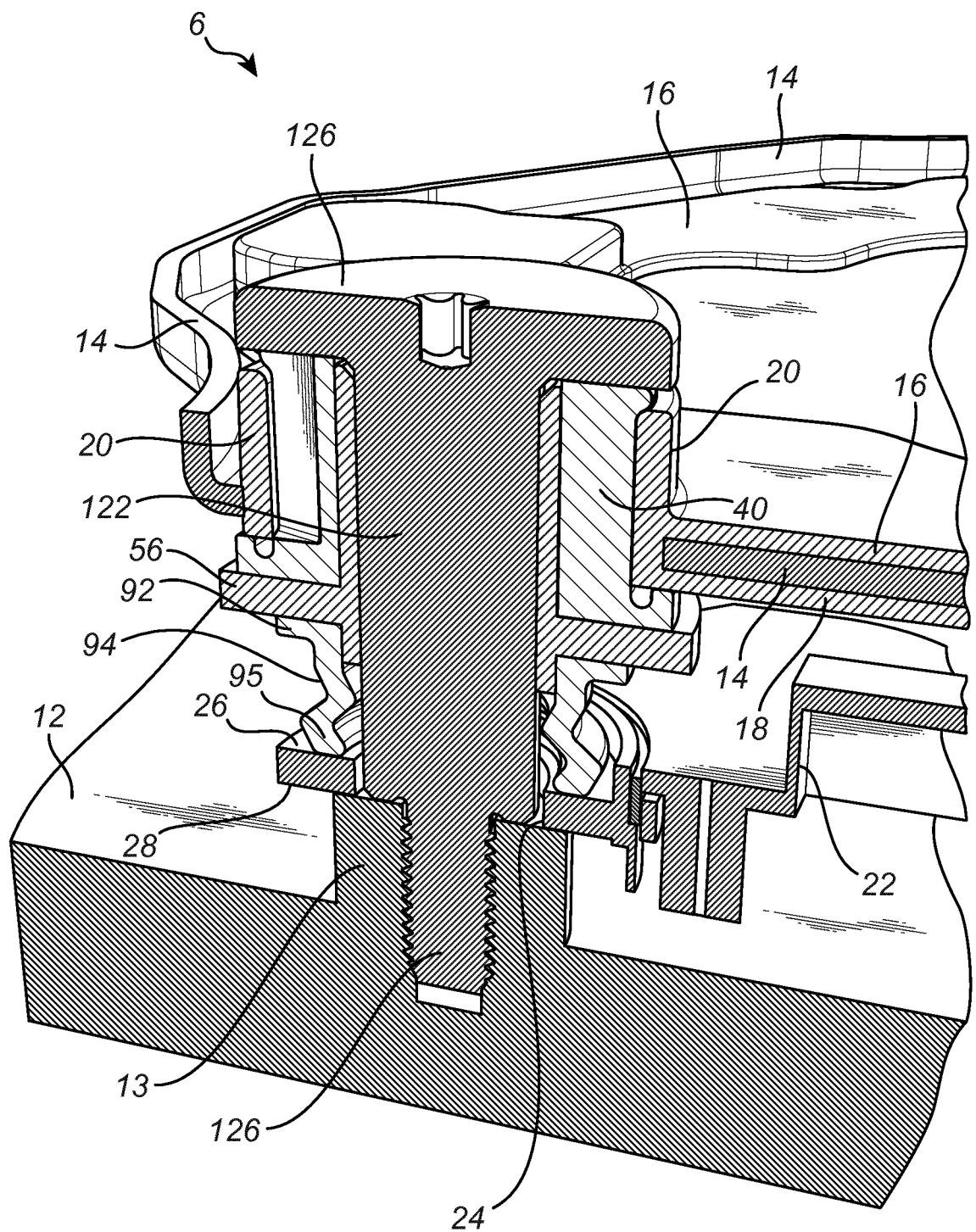
FIGS. 6 and 7 illustrate in larger scale a damper unit mounted in the assembly in FIG. 2.

The bracket 22 is a multi-function bracket for supporting various components, and may especially comprise parts of the horn switch mechanism of the steering wheel 2, here in the form of four contact studs 30 which project towards the horn plate 14 and are aligned with corresponding contact pads 15 protruding from the bottom side of the horn plate 14. As shown in FIG. 5, the contact studs 30 and the contact pads 15 are normally located at a distance D from each other. Upon horn activation, the horn plate 14 is pressed towards the bracket 22 until the contact pads 15 and the contact studs 30 are brought into electrical engagement for activating the horn, and at the same time a movement stop for the horn plate 14. As an illustrative example, the distance D may be in the order of a few millimeters.

The horn plate 14 with the airbag assembly fixed thereto is movably supported on the base structure 12 via three damper units 40. It may be noted that although this unit is termed "damper unit" in this disclosure, a damper unit 40 provides both a vibration damping function and a separate horn spring function as will be described below. Each damper unit 14 is configured to allow the mass represented at least by the horn plate 14 and the airbag assembly to move (i) perpendicular to the axis A of the damper unit 40 for vibration damping purposes, and (ii) along the main axis A for horn activation purposes. A 1st embodiment of a damper unit 40 will now be described with reference to FIGS. 8A to 8D, FIGS. 9A to 9D, and FIGS. 10A and 10B.

The damper unit 40 comprises a slider 50, a damper element 70 and a horn spring element 90. In a preferred embodiment, the slider 50, the damper element 70 and the spring element 90 may be bonded together into one unit 40, such that these three components form a unitary structure ready to be connected to the base structure 12 and the horn plate 14. The components 50, 70 and 90 may be mechanically and/or chemically bonded together, in the sense that they cannot easily be taken apart from each other.

FIGS. 8A to 8D illustrate a 1$^{st}$ embodiment of the slider 50. The slider 50 may be made from a relatively rigid material, such as a suitable synthetic resin material. In horn activation structures of the mechanical type, the slider is arranged to slide on a guide shaft upon horn activation as will be described below. The slider 50 comprises a tubular element 52 defining a through bore 54 for receiving the guide shaft, and a radially extending flange 56. The flange 56 divides the tubular element 52 into a first tubular part 58 on one side of the flange 56, and a second tubular part 60 on the axially opposite side of the flange 56. In the illustrated embodiment, the first tubular part 58 is longer than the second tubular part 60. The flange 56 presents one or more locking openings here in the form of a plurality of axially oriented through holes 62 used for mechanically bonding the damper element 40 and the horn spring element 90 together and to the slider 50. The flange 56 also serves to take up spring forces from the horn spring element 90, and to transfer axial forces between the slider 50 and the damper element 70.

Reference is now made to FIG. 9A to 9E illustrating a 1$^{st}$ embodiment complete damper unit 40. The elastic damper element 70 is arranged on the first slider part 58. The elastic damper element 70 is made of an elastomeric material, such as silicone rubber, suitable for use as the elastic spring element in a dynamic damper. The damper element 70 is configured to operate together with the mass represented by at least the airbag module and the horn plate 14 as a spring-mass system forming a frequency-tuned dynamic vibration damper for dampening the vibrations V in the base structure 12 and the steering wheel 2.

Figure 7:
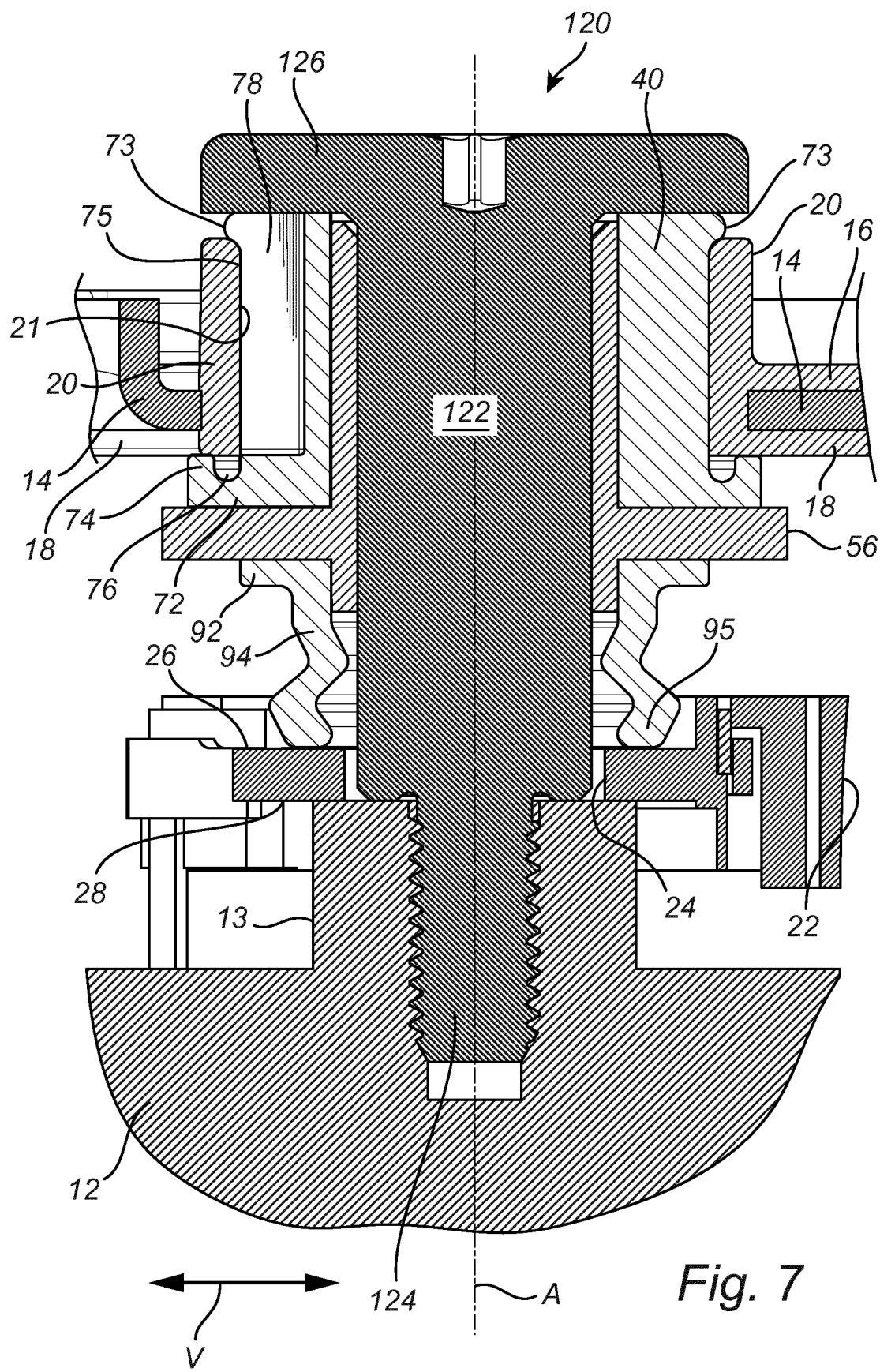

In the illustrated embodiment, the damper element 70 has a general cylindrical shape with a distal end 71 facing away from the flange 56, a proximal end 72 facing towards the flange 56, and an outer engagement surface 75. As an illustrative, but non-limiting example the axial length of the damper element can be in the order of 7 mm. In the final vibration-reducing assembly as shown in FIG. 7, the outer engagement surface 75 of each damper element 70 is in engagement with an inner engagement surface 21 of an associated sleeve 20 on the horn plate 14 for transferring vibrations to the horn plate 14. In the illustrated embodiment, the axial length of the damper element 70 corresponds essentially to the axial length of the first slider part 58 but extends axially a short distance beyond the distal end of the first slider part 58. The proximal end 72 of the damper element 70 is in contact with the flange 56. The distal end 71 of the damper element 70 has an increased outer diameter for forming a ring-shaped radial extension 73. The proximal end 72 of the damper element 70 has an even larger diameter and is arranged to extend under the horn plate 14 in the assembly 6. The proximal end 72 may present an upwardly directed support ring 74 defined by a ring-shaped groove 76 for reasons that will be explained below.

In the illustrated $1^{st}$ embodiment, the damper element 70 is divided into a plurality of axially extending ribs 77 (FIG. 9D), which are circumferentially distributed about the axis A of the damper unit 40 and which define spaces 78 there between. The radially outer surfaces of the ribs 77 together form the outer engagement surface 75 of the damper element 70. The operation and advantages obtained by the ribs 77 and the spaces 78 will be explained below. In other embodiments, the damper element 40 may have the form of a circumferentially unbroken cylinder defining a continuous outer engagement surface.

The horn spring element 90 of the damper unit 40 is arranged on a second part of the slider 50, in this embodiment on the axially opposite side of the flange 56 on the second tubular part 60 and also on part of the flange 56. The horn spring element 90 is made from an elastomeric material and comprises a horn spring part 94 and an attachment part 92 (FIG. 9C), which are molded from an elastomeric material in one piece with each other. During molding of the horn spring element 90, at least the attachment part 92 thereof is molded on the slider 50 such that the horn spring element 90 is correctly positioned on the slider 50 when being manufactured.

Figure 9A:
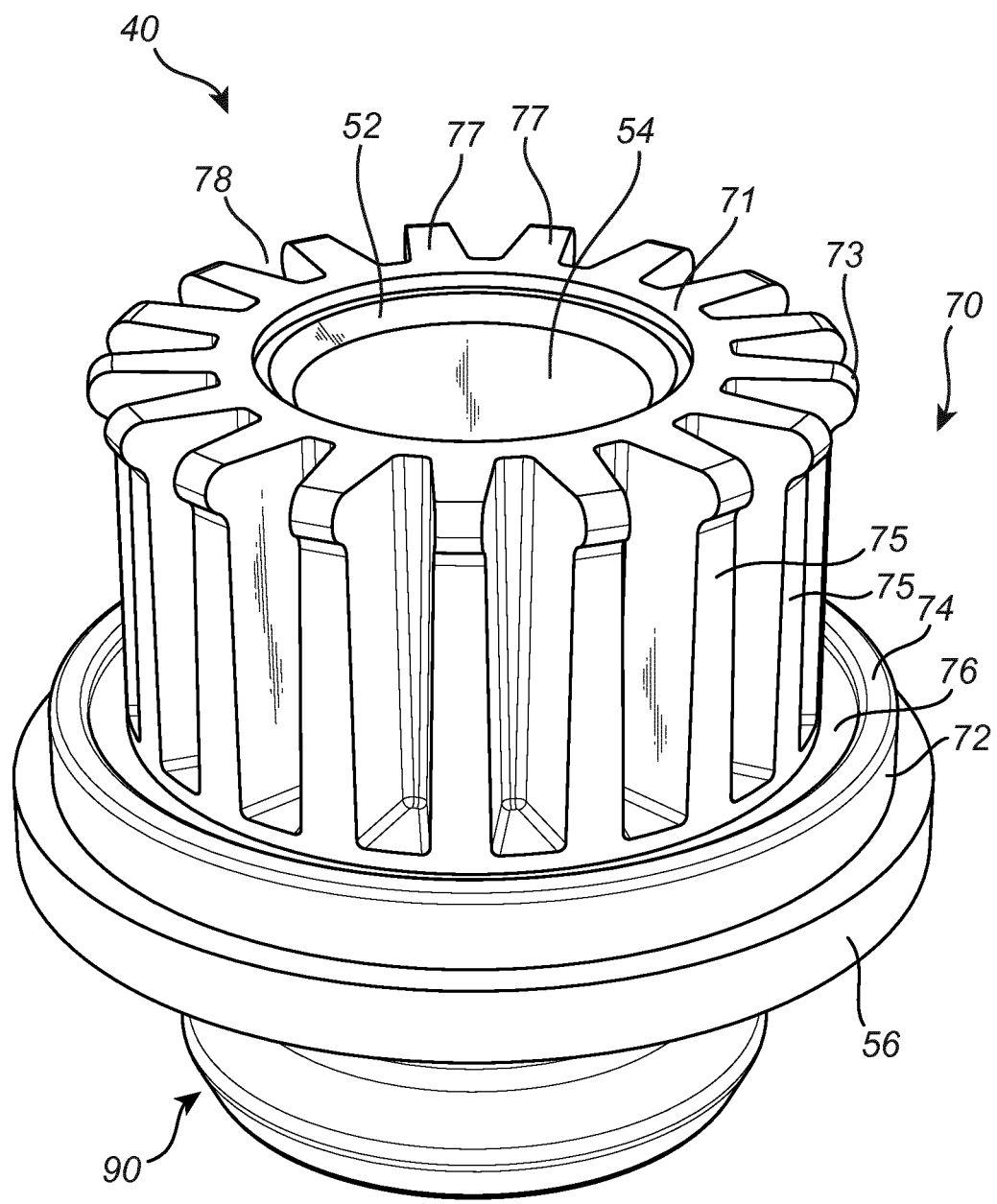
FIGS. 9A to 9E illustrate a $1^{st}$ embodiment of a damper unit.
Figure 9B:
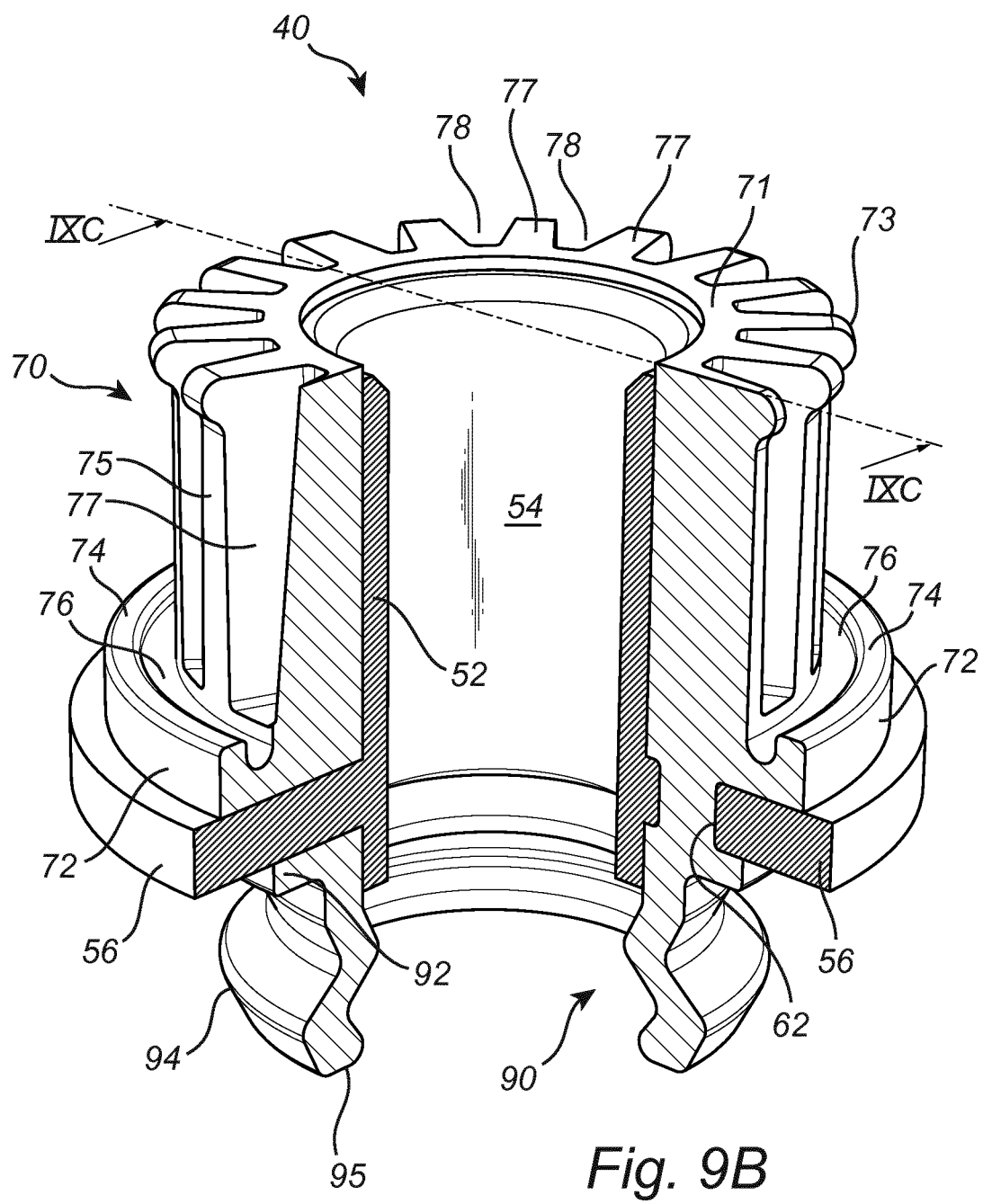
Figure 9C:
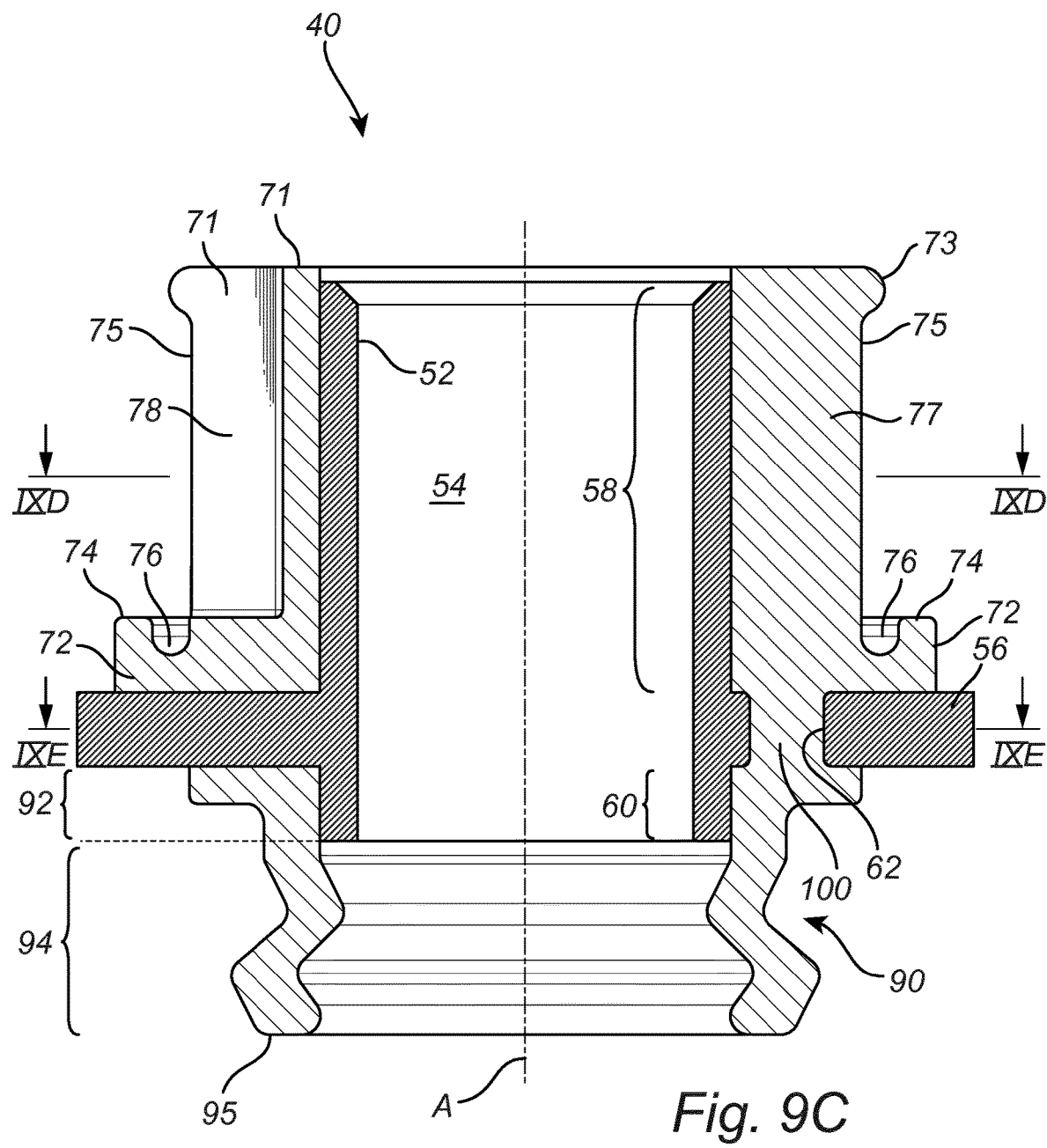
Figure 9D:
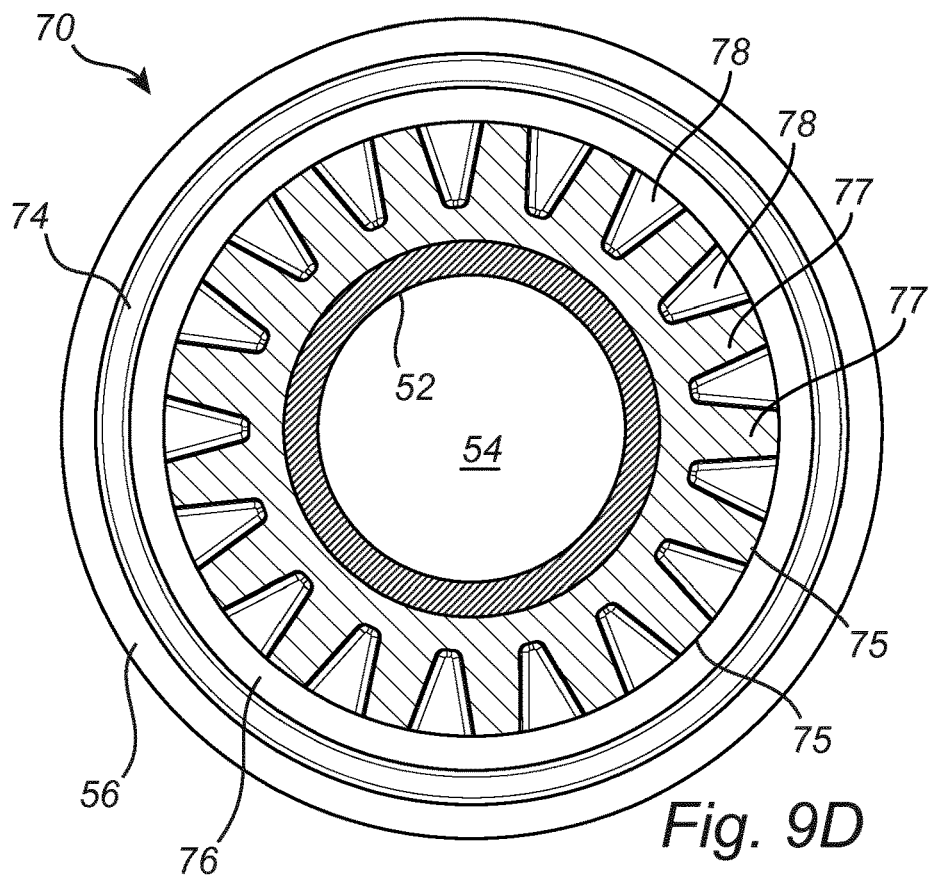
Figure 9E:
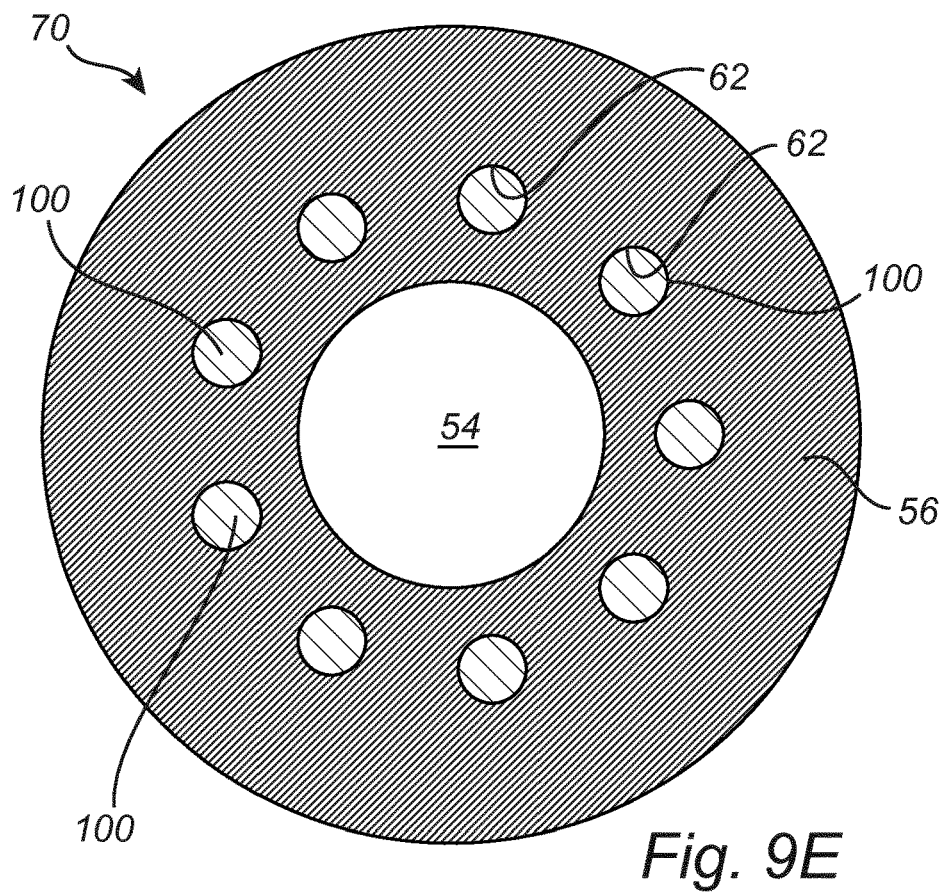
Figure 10A:
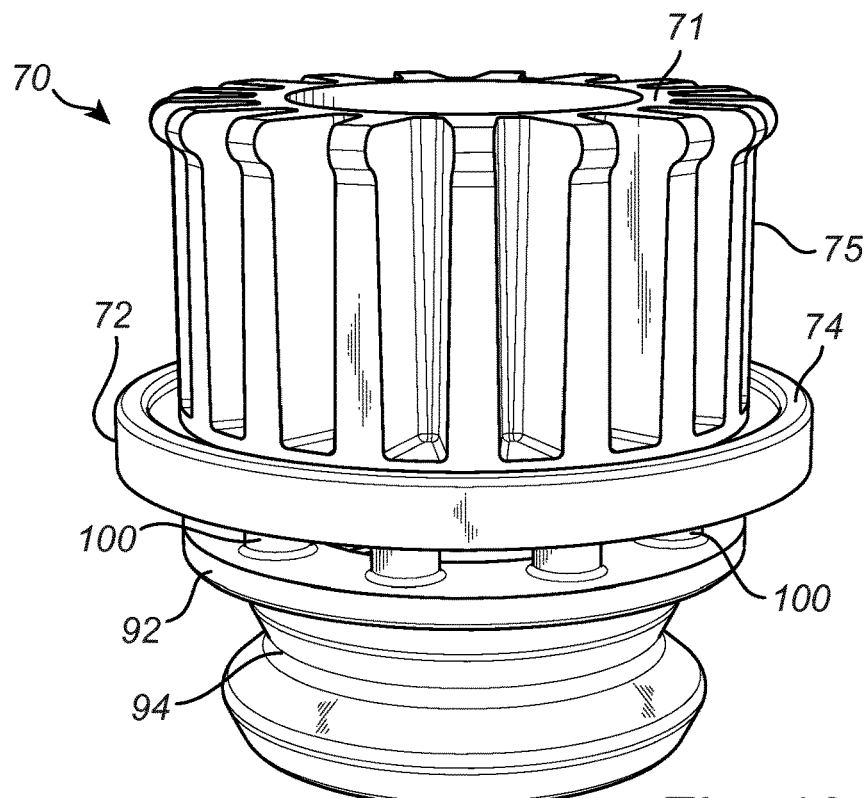
FIGS. 10A and 10B illustrate a unitary elastomeric body of the damper unit according to the $1^{st}$ embodiment.
Figure 10B:
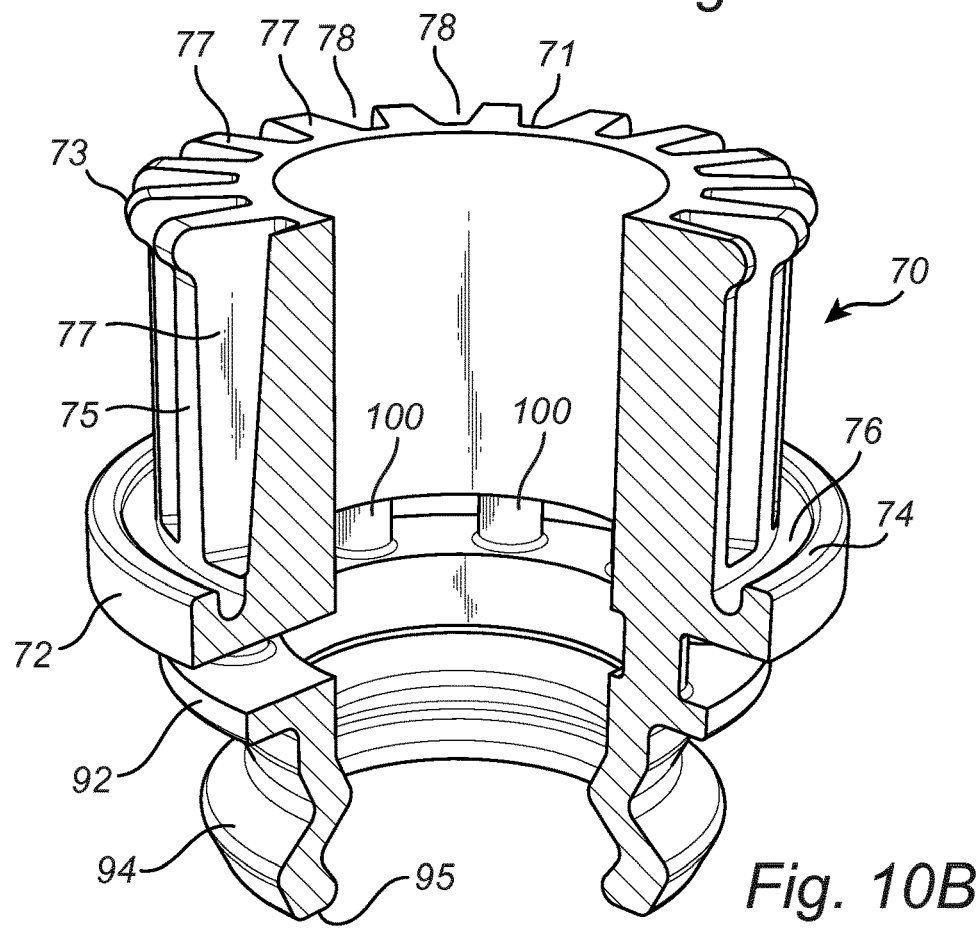

As best shown in FIG. 9C, the attachment part 92 of the horn spring element 90 has an L-shaped cross section with one leg in contact with the shorter tubular part 60 of the slider 50 and one leg in contact with the flange 56. In other embodiments, the shorter tubular part 60 is dispensed with and the attachment part 92 may engage the flange 56 only.

The elastomeric material used for the horn spring element 90 may be any elastomeric material suitable to provide the aimed-at horn spring function, depending on the required spring constant. In a preferred embodiment, the material comprises silicone rubber. The same elastomeric material may be used for molding the damper element 40 and the horn spring element 90, especially if these elements are molded in one piece with each other. In the illustrated first embodiment, the horn spring part 94 is bellows-shaped in order to provide the spring action in the direction of the axis A. Other embodiments may have a different spring design, relying in part or only on compression rather than flexing as in the bellows-shaped design. The spring constant may be varied by varying one or more parameters of the horn spring part 94, such as the material, the axial length, the diameter, the wall thickness, and the bellows-design (angles, etc.). It may also be possible to use a "broken" design presenting openings and/or separate spring legs, which also would present further tuning options for the spring characteristics.

In the final vibration-reducing assembly 6, the molded horn spring part 94 is configured to act as a horn spring in the direction of the axis A, to exert a spring force on the horn plate 14 via the slider 50 and the damper element 40. The spring force will be present for returning the horn plate 14 when the horn activation is terminated. Due to the pre-compression of the horn spring part 94, the spring force is present as a biasing spring force in the non-activated state also. An advantage obtained thereby, is that the spring force generated by the horn spring is essentially immediately available as soon as the driver operates the horn.

In the illustrated first embodiment, the horn spring element 90 is molded directly on the slider 50, avoiding the need to manufacture a metal spiral spring separately, and to attach and/or align such a separate metal spiral spring in relation to the slider during the assembly. At present, over-molding is considered a preferred molding method, but other techniques may also be considered, such as 2K injection molding where both the slider 50 and the elastomeric components are manufactured using one single 2K injection molding machine. Although not presently preferred, different molding techniques may be used for the damper element 70 and the horn spring element 90. In preferred embodiments, the horn spring element 90 is not only molded on the slider 50 but is also bonded to the slider 50. The bonding may be mechanical (including frictional bonding) and/or chemical.

In the illustrated $1^{st}$ embodiment, the horn spring element 90 is mechanically bonded to the slider 50 to keep the horn spring element 90 in the illustrated position on the slider 50. This is achieved by a plurality of locking elements 100, which are molded in one piece with the horn spring element 90 and which are in locking engagement with the locking openings 62 in the flange 56. In the illustrated embodiment, the damper element 40 also is mechanically bonded to the slider 50 to keep the damper element 40 in the illustrated position on the slider 50. This is also achieved by the locking elements 100. In the preferred embodiment, the same locking elements 100 are used for bonding both the horn spring element 90 and the damper element 40, such that the elastomeric horn spring element 90, the elastomeric damper element 40 and the locking elements 100 are molded together as one unitary body, mechanically bonded to the slider 50 by the through openings 62. For explanatory purposes only, this unitary elastomeric body 70, 90, 100 is shown without the slider 50 in FIGS. 10A and 10B. In this embodiment, there may also be a frictional bonding between the elastomeric elements 70, 90 and the tubular parts of the slider 50.

In some embodiments, one or both of the damper element 40 and the horn spring element 90 may be chemically bonded to the slider 50 by adhesion. It is also possible to use both mechanical bonding as disclosed in the drawings, and chemical adhesion, for one or both of the damper element 40 and the horn spring element 90. The chemical adhesion may be implemented during molding. It is also possible to rely on frictional bonding, only or in part. Frictional bonding may be obtained by a post-molding shrinking of the elastomeric material.

A method for assembling the vibration-reducing assembly 6 using a number of damper units 40 according to the $1^{st}$ embodiment will now be described with reference to FIGS. 2 to 7. The sequence or order of steps as described here may be varied. As a first step, the bracket 22 may be placed upon the projections 13 of the base structure 12. As a second step, the slider 50 and the ribbed-shaped damper element 70 of each damper unit 40 may be inserted from below in FIG. 2 into an associated opening of the horn plate 14.

It should be noted that slider 50 and the elastomeric damper element 70 of each damper unit 40 are inserted together and from one side only of the horn plate 14. During insertion of the damper element 70, the radially outer engagement surface 75 of the damper element 70 is brought into engagement with the inner engagement surface 21 of the corresponding sleeve 20, such that steering wheel vibrations V may be transferred from the damper element 70 to the horn plate 14. Preferably, the radial dimensions are selected such that the damper element 70 is somewhat radially compressed between the slider 50 and the inner engagement surface 21 of the sleeve 20.

During the insertion of the damper element 70, the support ring 74 integrally formed with the damper element 70 will engage the bottom side of the horn plate 14 as shown in FIG. 7, defining the final insertion position. During the insertion of the damper element 70, the upper radial extension 73 of the damper element 70 will be temporarily compressed in order to pass the sleeve 20. In the final position, the extension 73 will extend over the upper edge of the sleeve 20. Thereby, the support ring 74 and the radial extension 73 will together ensure that the damper element 70 is held correctly axially positioned/locked in relation to the horn plate 14. No separate locking elements are needed, and the axial locking is automatically obtained during the one-sided insertion of the damper unit. It will also be noted that an axial distal part of the elastomeric damper element 70 in this 1$^{st}$ embodiment will extend axially beyond the distal edge of the sleeve 20.

When the damper elements 70 have been correctly positioned in the horn plate 14, a bolt 120 may be inserted into the bore 54 of each slider 50. Each bolt 120 has a bolt head 126, a cylindrical guide shaft 122 and a threaded end 124. The tubular part 52 of the slider 50 may slide along the guide shaft 122. As shown in FIG. 7, the bolts 120 are secured in the bolt holes of the extensions 13 of the base structure 12. During the final fastening of each bolt 120, a pre-compression of the corresponding horn spring part 94 is obtained. As a non-limiting example, a horn spring part may be pre-compressed from 10 mm to 7 mm during assembly and then further compressed one or a few mm upon horn activation. In the final assembly, the distal end 95 of each horn spring part 94 engages the associated horn spring support surface 26 of the bracket 22. In the final assembled state, the bolt head 126 is in axially engagement with the upper end 71 of the elastomeric damper element 70, with the radial extension 73 projecting between the sleeve 20 and the bolt head 126.

It will be understood that the disclosed method of making the damper unit 40 and assembling a vibration-reducing assembly using the inventive damper units 40 may provide substantial advantages in terms of manufacturing cost and time, but also in terms of quality. Compared with the prior art where a number of individual parts have to be manufactured, handled and assembled, the inventive concept makes it possible to establish—at each damper unit 40—both the damper function and the horn spring function using one unitary damper unit 40 only, together with a simple bolt 120, compared to the prior art where a number of different components must be handled and assembled, often from different sides of the horn plate 14.

The operation of the horn mechanism of the assembly 6 is as follows: When the horn mechanism is not activated by the driver, each pre-compressed or biased horn spring part 94 presses against the flange 56 of the slider 50, urging the slider 50 upwards in a direction away from the base structure 12. The axial spring force is transferred via the flange 56 to the damper element 70, and via the support ring 74 to the horn plate 14. It will here be noted that the bolt 120 has multiple functions:

the bolt 120 provides the guide shaft 122 for the axial movement of the slider 50 during horn activation;
the bolt head 126 defines an upper axial stop for the axial movement of the damper unit 40, and
the bolt head 126 assists in locking the damper unit 40 in place in relation to the horn plate 14 by pressing on the top of the damper element 70.

In the illustrated embodiment, the distal end 71 of the damper element 70 extends a short distance beyond the upper edge of the sleeve 20, whereby the upper stop position of the damper unit 40 is defined by a soft engagement between the end 71 of the damper element 70 and the bolt head 120.

Upon horn activation, when the driver presses the horn pad 8 on the steering wheel 2, the horn plate 14 is pressed towards the base structure 12. The force is transferred via the damper element 70 to the slider 50, which is thereby displaced along the guide shaft 122 compressing the horn spring part 94 further in the axial direction until the distance D in FIG. 5 is reduced to zero and the horn switch 15, 30 is closed. When the pressure on the horn pad 8 is released, the horn spring part 94 will return the horn plate 14 to its normal position, whereby the soft engagement between the elastomeric end portion 71 and the bolt head 124 provides a "soft" stop.

The damper function of the assembly 6 is as follows: Steering wheel vibrations V (FIG. 7) occurring in the steering wheel 2 and the base structure 12 are transferred via the bolts 120 and the sliders 50 to the elastomeric damper elements 70. The damper elements 70 transfer the steering wheel vibrations V to the horn plate 14 via the sleeves 20, thereby causing the mass (represented by the weight of the horn plate, the airbag assembly and any other details supported by the horn plate 14) to vibrate out of phase such that the vibrations V in the steering wheel 2 are dynamically dampened. During the vibration dampening, the radial compression of the elastomeric material of the damper elements 70 will vary. Thanks to the ribbed design of the damper elements 70, the compressed elastomeric material may expand into the spaces 78 between the ribs 77. This solution gives an advantageous more linear relation between the damper compression and the spring constant of the damper element 70. In a non-ribbed, solid cylinder of elastomeric material, the material has no such "escape", resulting in a more non-linear spring constant, making the dynamic dampening function less efficient because matching the target frequency will be more difficult. A further advantage obtained by the ribbed configuration is an increased flexibility in the frequency tuning during design and manufacturing. The dampening frequency of the assembly may be tuned by varying one or more parameters such as the number of ribs 77, the circumferential, radial, and/or axial dimensions of the ribs 77 and the spaces 78 between the ribs 77. Thus, one may use thicker or thinner ribs; longer or shorter ribs in the axial direction; longer or shorter ribs in the radial direction, etc. Also, the frequency interval within which the damper element 70 is tunable may be expanded by using a ribbed configuration compared to prior-art damper elements.

During the vibration damping operation, the horn plate 14 will thus be caused to move in directions perpendicular to the axis A, especially in relation to the lower or proximal part 72 of the damper element 70 supporting the horn plate 14 in the axial direction. Since the radially moving horn plate 14 at its rear side is in direct contact with the surface of the lower part 72, such radial movements of the horn plate 14 may give rise to unwanted frictional movements and silicone wear at the interface between the bottom side of the horn plate 14 and the damper element 70 at reference numeral 74 in FIG. 7. Also, this direct axial contact between the lower part 72 of the damper element 70 and the rear side of the horn plate 14 may influence the damping function (tuning) in a negative way. This is the reason for providing the ring shaped groove 76. Thereby, the support ring 74 will be more free to move in the left-right direction in FIG. 7, together with a left-right movement of the horn plate 14 during damping, resulting in less frictional movements between the horn plate 14 and the damper element 70, and also resulting in a "de-coupling" of the vibration dampening from the contact between damper element part 70 and the rear side of the horn plate 14.

$2^{nd}$ Embodiment

Figure 11A:
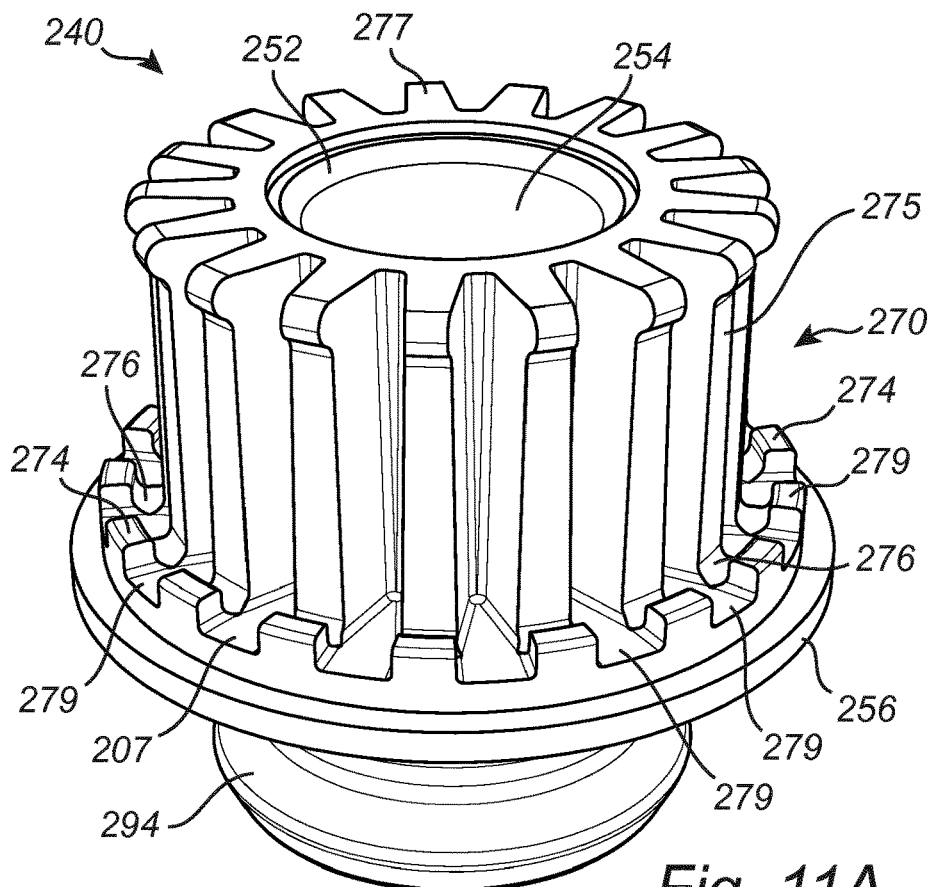
FIGS. 11A and 11B illustrate a $2^{nd}$ embodiment of a damper unit.
Figure 11B:
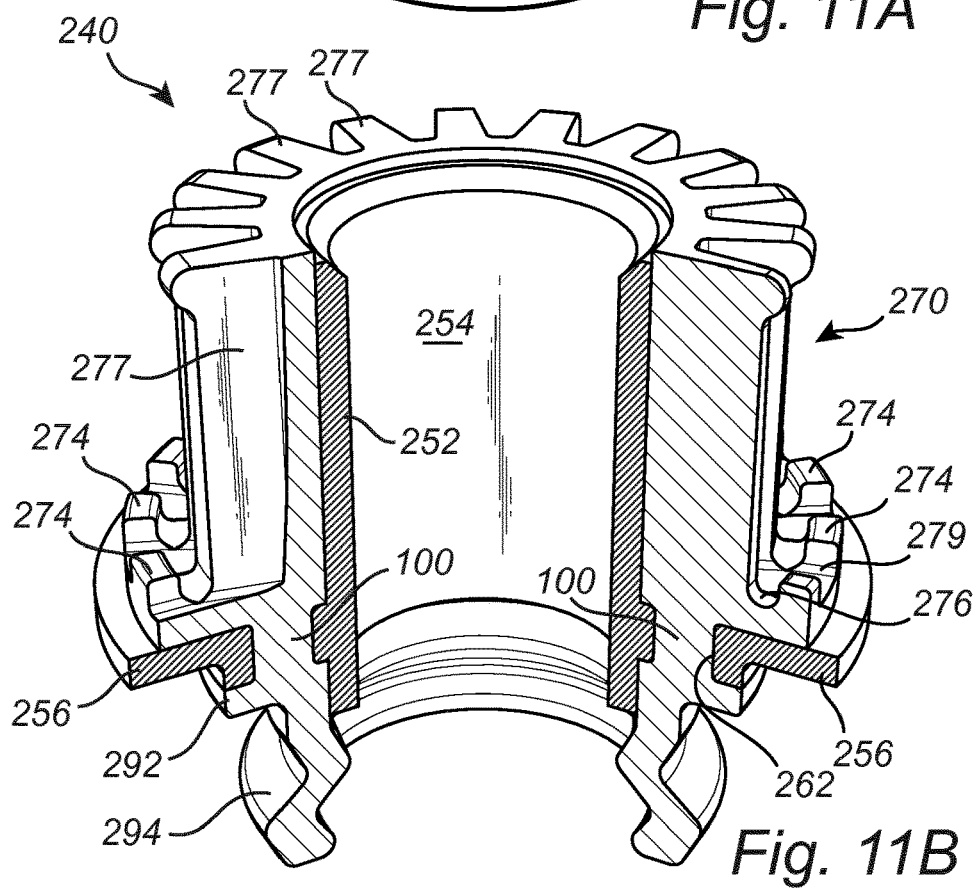

FIGS. 11A and 11B illustrate a $2^{nd}$ embodiment of a damper unit 240. Same reference numerals are used as in the first embodiment above, but in a 200-series. Although the solution with the ring 74 and the ring-shaped groove 76 as described in the preceding paragraph may be advantageous, it will be noted that the added movability is obtained in the vibration direction only. If for instance the vibrations V are directed left-right in FIG. 7, then the parts of the support ring 74 shown to the left and to the right in FIG. 7 would be free to move with the horn plate 12 due to the groove 76. However, at different circumferential locations on the support ring 74 facing towards and away from the reader in FIG. 7, such left-right movement will not be allowed by the groove 76.

In order to address this problem, the bottom part 271 of the damper element 270 according to the $2^{nd}$ embodiment may be designed as shown in FIGS. 11A and 11B. The support ring 74 in the $1^{st}$ embodiment is divided in the circumferential direction into a number of individual support studs 274 with spaces 279 there between in the circumferential direction. Compared to the ring design 74, the individual support studs 274 will be more flexible in all radial directions. This design will allow the support studs 274, which are in engagement with the rear side of the horn plate 14, to move together with the horn plate 14 during vibration damping, both radially and circumferentially in relation to the axis A without substantially affecting the vibration damping operation. This design allows the support studs 274 to better follow the movement of the horn plate 14. In order to obtain a uniform movability in all directions, the support studs 274 may preferably have a circular cross section, i.e. essentially same dimensions in all directions perpendicular to the axis A.

$3^{rd}$ Embodiment

Figure 12A:
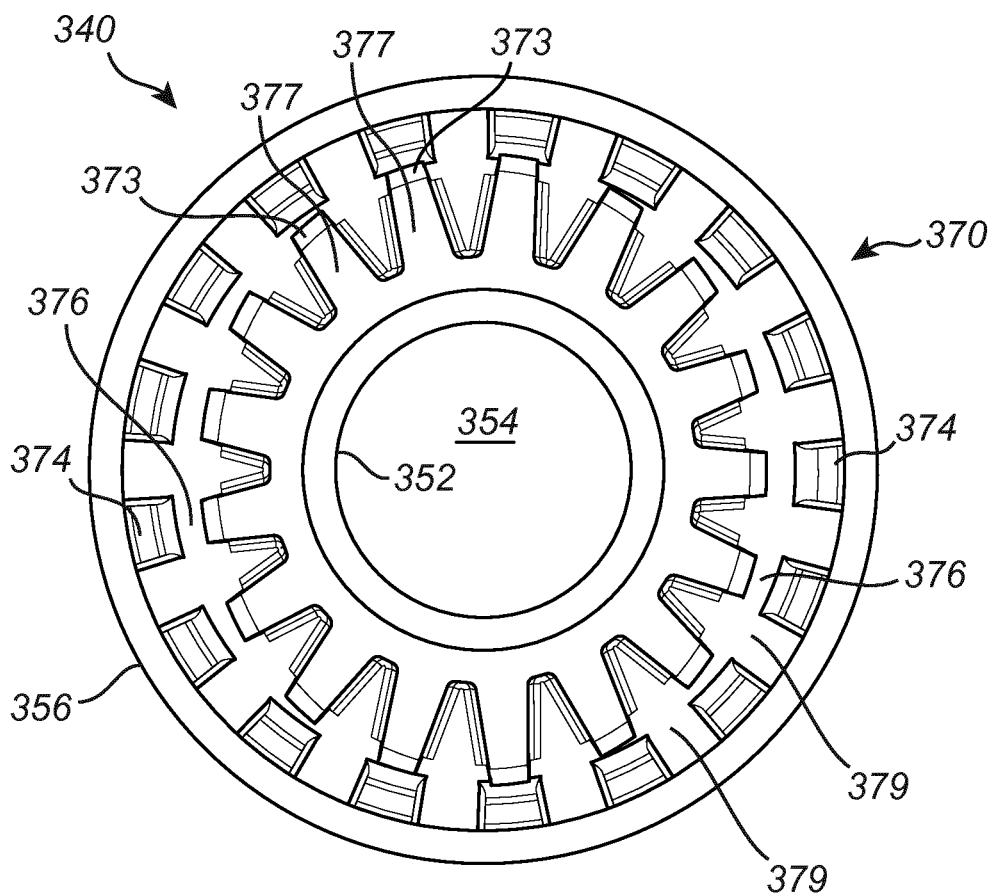
FIGS. 12A and 12B illustrate a $3^{rd}$ embodiment of a damper unit.
Figure 12B:
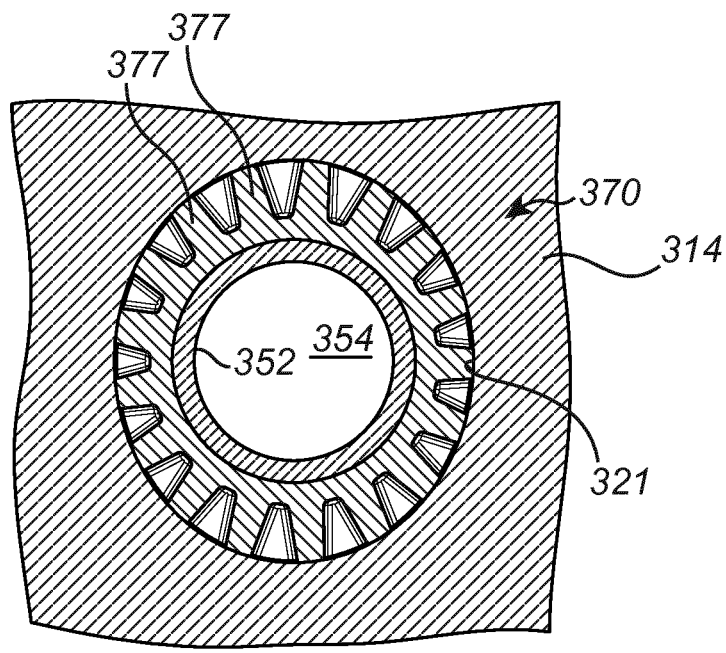
Figure 13A:
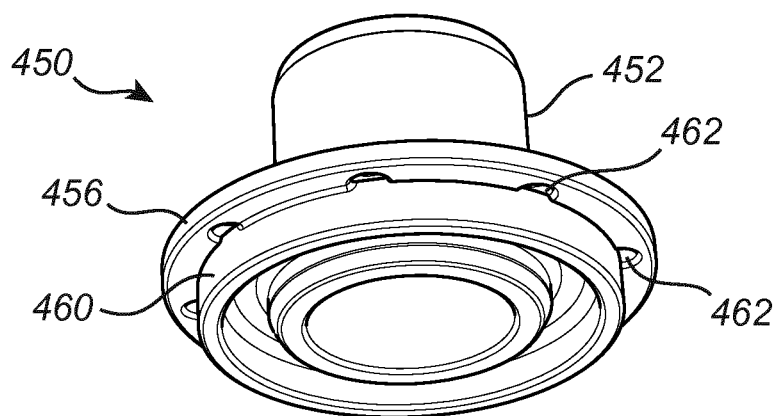
FIGS. 13A to 13D illustrate a slider of a $4^{th}$ embodiment of a damper unit.
Figure 13B:
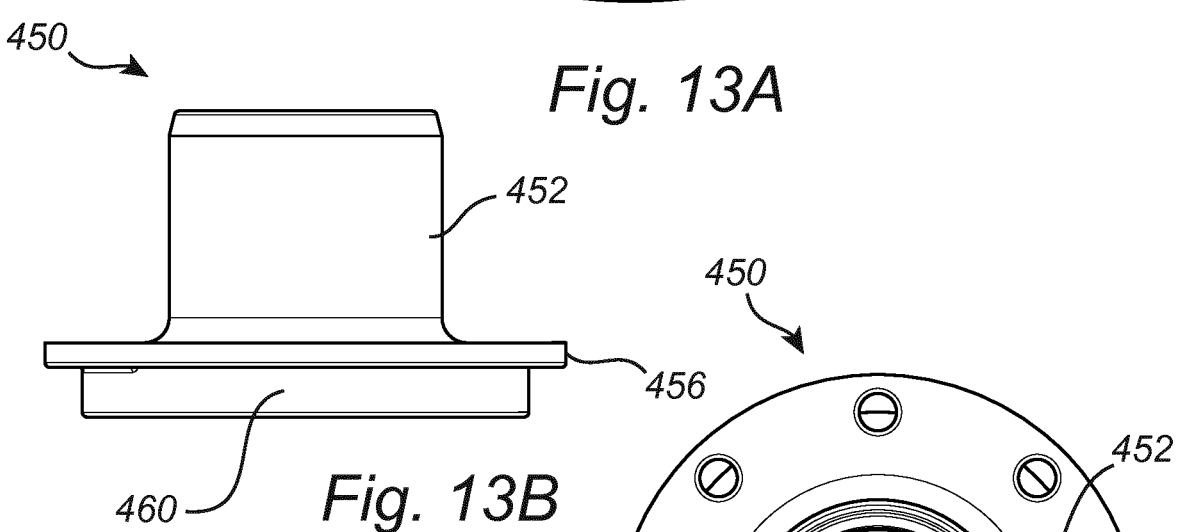
Figure 13C:
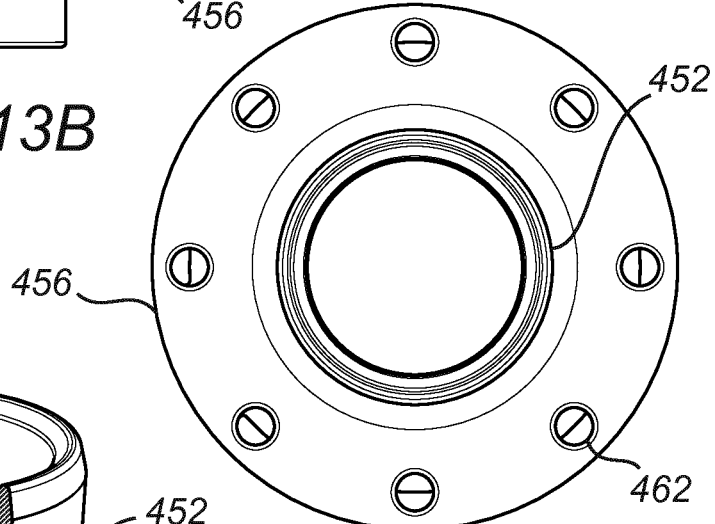
Figure 13D:
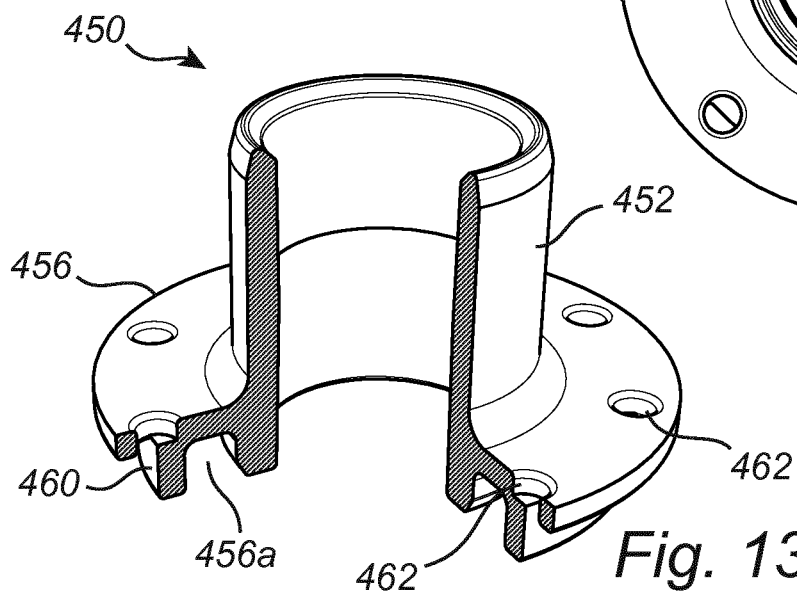

FIGS. 12A and 12B illustrate a third embodiment of a spring unit 340 for use in situations where different dampening properties are required in different directions. Same reference numerals are used as above, but in a 300-series. Support studs 374 and spaces 376 are arranged as in the $2^{nd}$ embodiment. In the $3^{rd}$ embodiment, the elastomeric damper element 370 of the spring unit 340 has a non-circular configuration, such as an oval or elliptic configuration. As shown in FIG. 12B, the non-circular damper element 370 is received in a corresponding non-circular opening 321 in the horn plate 14. By this no-circular design, the assembly may present different tuning frequencies in the vertical and the horizontal direction in FIG. 12B.

$4^{th}$ Embodiment

Figure 15A:
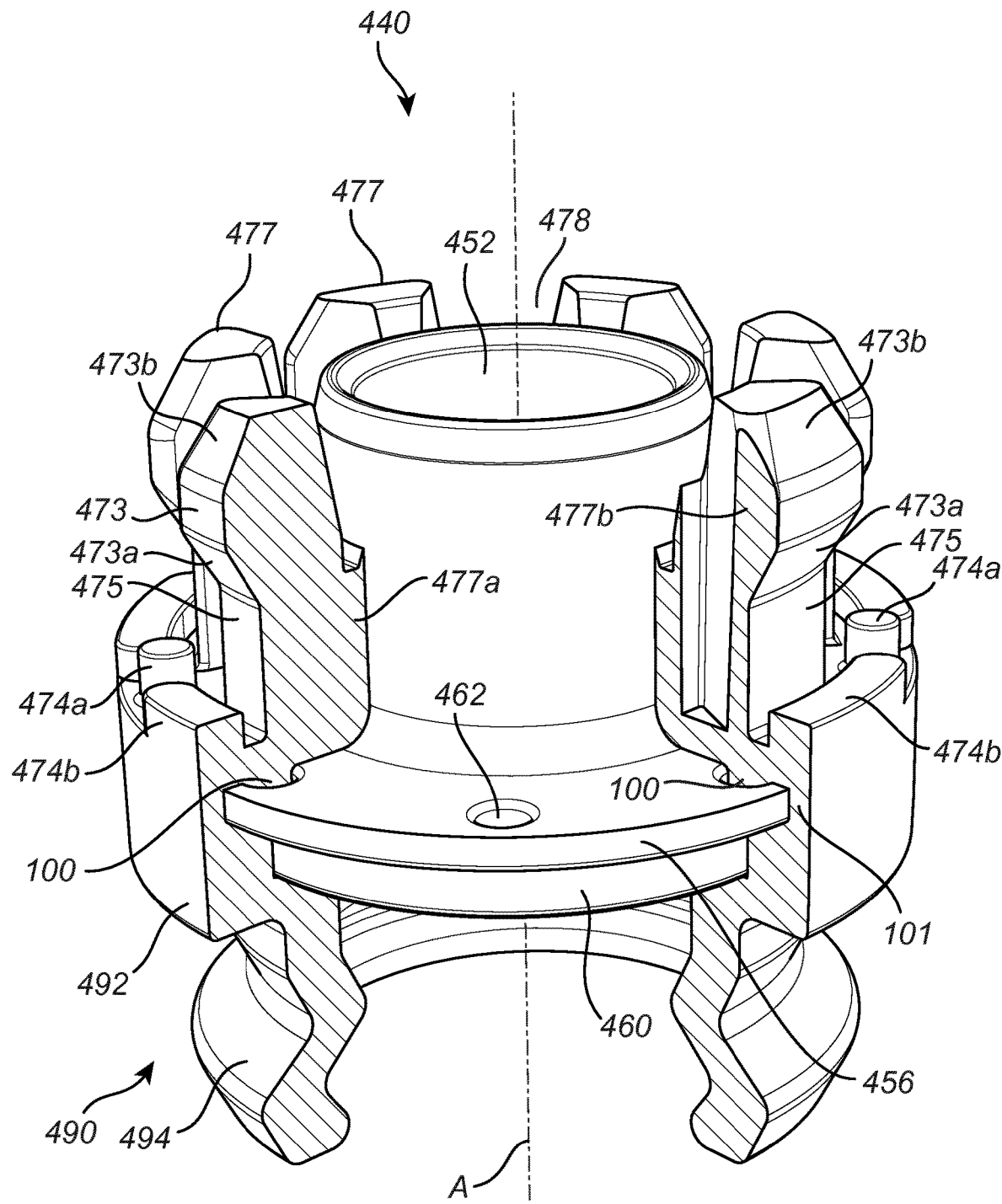
FIGS. 15A to 15C illustrate the damper unit according to the $4^{th}$ embodiment.
Figure 15B:
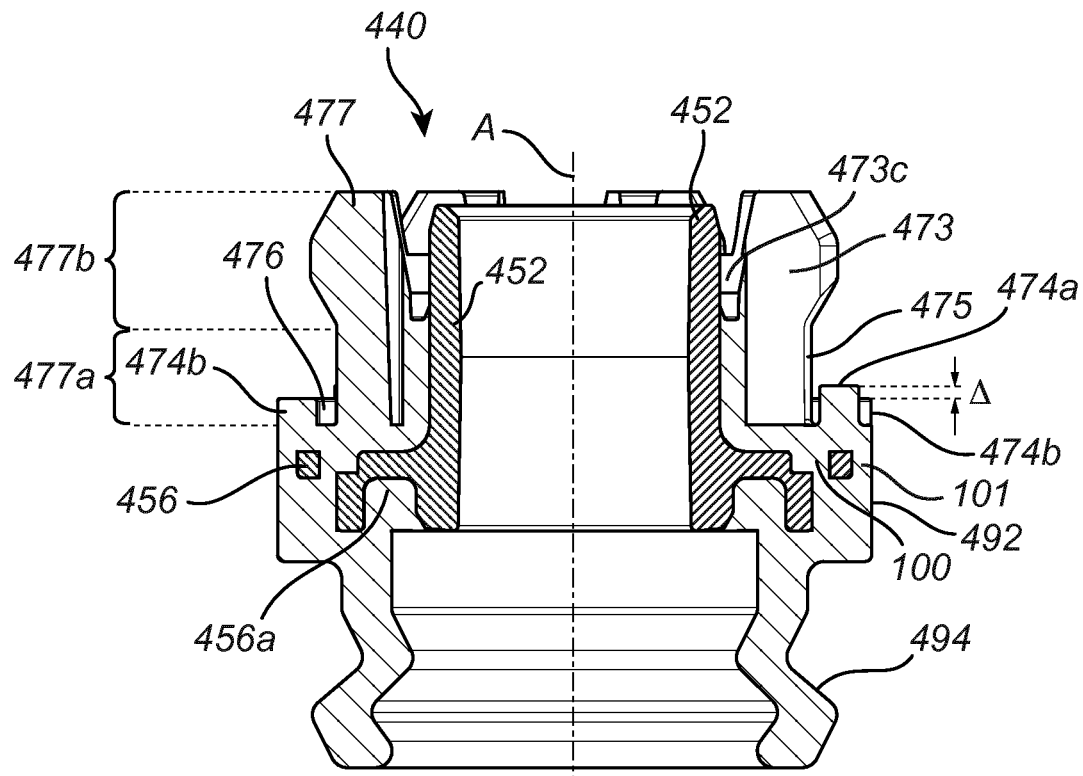
Figure 15C:
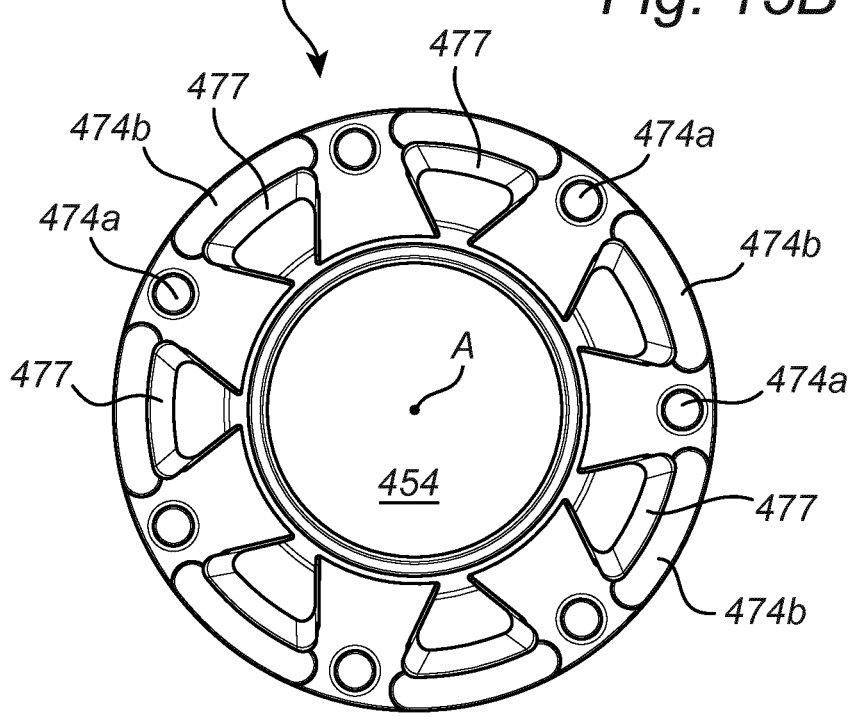

FIGS. 15A to 15C illustrate a $4^{th}$ embodiment of a damper unit 440. The same reference numerals are used as above, but in a 400-series. The slider 450 of the damper unit 440 is shown in FIGS. 13A to 13D. The damper element 470 of the damper unit 440 is shown in FIGS. 14A to 14D. Everything stated above for the previous embodiments regarding the manufacture, optional bonding, function, material, etc. applies to this embodiment 440 also in all relevant parts.

Like in the $2^{nd}$ embodiment, the damper element 470 of the damper unit 440 according to the $4^{th}$ embodiment is divided into a plurality of axially extending ribs 477, which are circumferentially distributed about the axis A of the damper unit 440 and which define spaces 478 there between. The operation and advantages of the ribs as described above will apply in all relevant aspect to this $4^{th}$ embodiment also. However, this $4^{th}$ embodiment of the damper unit 440 presents some additional features.

In the $4^{th}$ embodiment, and as seen in the direction of the axis A, each rib 477 has proximal rib part 477a forming the vibration damping part of the rib 477, and a distal rib part 477b not primarily taking part in the vibration damping operation (FIGS. 14A to 14C). The proximal rib part 477a has an outer radial surface 475 extending in parallel with the axis A. The radially outer surfaces 475 of the ribs 477 together form the outer engagement surface of the damper element 470. In the final assembly, the proximal rib part 477a will be held in a slightly compressed state in the radial direction as described above. The distal rib part 477b has a radial extension 473 for locking purposes, similar to the radial extension 73 in the $1^{st}$ embodiment. The radial extension 473 presents a proximal inclined locking surface 473a and a distal inclined insertion surface 473b. Furthermore, in the illustrated $4^{th}$ embodiment, there may be a gap 473c in the radial direction between the distal rib part 477b and the tubular element 458 of the slider 450. In other embodiments, this radial gap 473c may be dispensed with.

The horn spring element 490 of the damper unit 440 is arranged on the opposite side of the slider flange 456 on the lower tubular part 460 of the slider 450. What stated above in the $1^{st}$ embodiment regarding the structure, the manufacturing, alternatives, and the operation of the horn spring element 90 applies to the horn spring element 490 in this $4^{th}$ embodiment in all relevant aspects. In the illustrated embodiment, the horn spring element 490 is molded in one piece with the elastomeric damper element 470 on the slider 450 as in the $1^{st}$ embodiment, with elastomeric locking elements 100 extending through openings 462 in the slider flange 456. In this embodiment, a portion 101 of the elastomeric material also extends radially outside the outer rim of the slider flange 456. In alternative embodiments, the damper element 470 and the horn spring element 490 may be held together in one piece by locking elements 100 only or by the portion 101 only.

In the $4^{th}$ embodiment, and as shown in FIGS. 14A to 14C and FIGS. 15A to 15D, the elastomeric damper element 470 is provided with a first set of individual support studs 474a and a second set of individual support studs 474b. The support studs 474a in the first set are slightly higher in the axial direction by an amount Δ compared to the support studs 474b in the second set. As a non-limiting example, the value of Δ may be in the order of one or a few millimeters. In the illustrated embodiment, the support studs 474a, 474b of the two sets are interlaced in the circumferential direction. The support studs 474a, 474b are spaced from each other in the circumferential direction and spaced from the slider in the radial direction. In preferred embodiment as shown, the support studs 474b in the second set are larger than the support studs 474a in the first set in that they have a larger cross-section perpendicular to the axis A. In the following, these different studs will be referred to as the smaller support studs 474a and the larger support studs 474b. In the illustrated embodiment, the smaller support studs 474a have a circular cross-section and the larger support studs 474b have an elongate cross-section. The design and shape of the support studs 474a and 474b may vary from the example. The smaller support studs 474a have essentially the same function as the support studs 274 in the $2^{nd}$ embodiment, i.e. they ensure that the contact or interface between the supporting studs and the rear side of the horn plate 14 is flexible in the radial plane in order not to interfere with the vibration damping. The function of the larger studs 474b will be explained below.

Figure 16A:
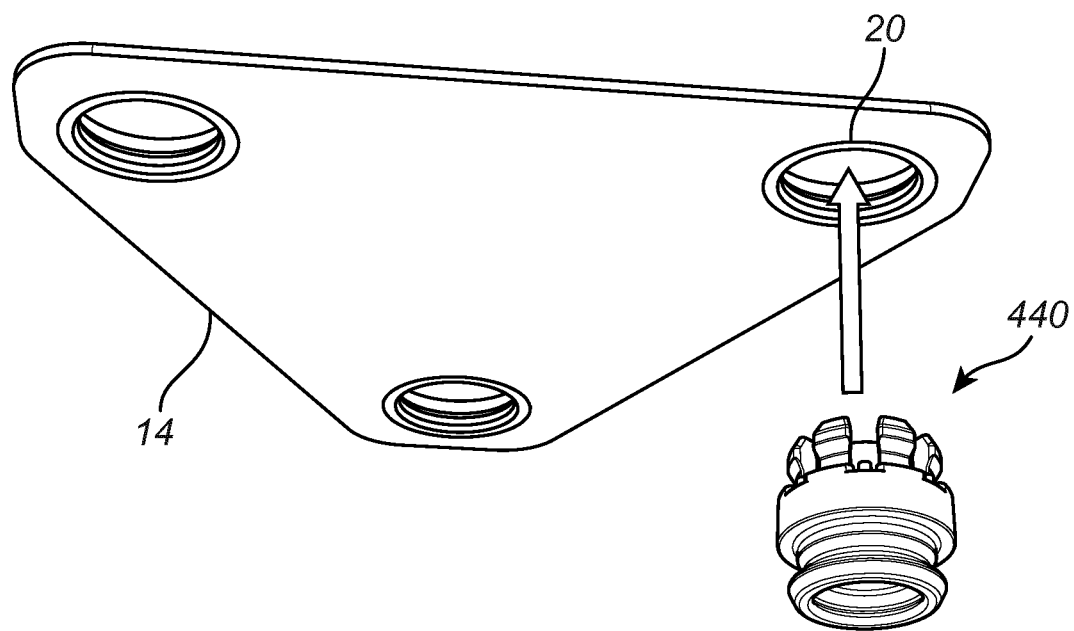
FIGS. 16A to 16F illustrate an assembly method using the damper unit according to the $4^{th}$ embodiment.

FIGS. 16A to 16E illustrate a method for assembling a vibration damper assembly 6 (FIG. 16F) comprising three damper units 440 according to the $4^{th}$ embodiment. FIG. 16A illustrates a damper unit 440 to be inserted from below into one of three openings in a horn plate 14. As in the previous embodiments, the slider 450 and the elastomeric damper element 470 of each damper unit 440 are inserted together and from one side only of the horn plate 14. In the illustrated embodiment, each opening of the horn plate 14 is provided with a sleeve 20. The sleeve is preferably made of a relatively rigid material, such as a rigid plastic material molded to the horn plate. One function of the sleeve 20 is to provide an axially extended engagement surface for the damper element 470. Another function of the sleeve 20 is to protect the elastomeric damper element 470 from damage during assembly and during operation.

Figure 16B:
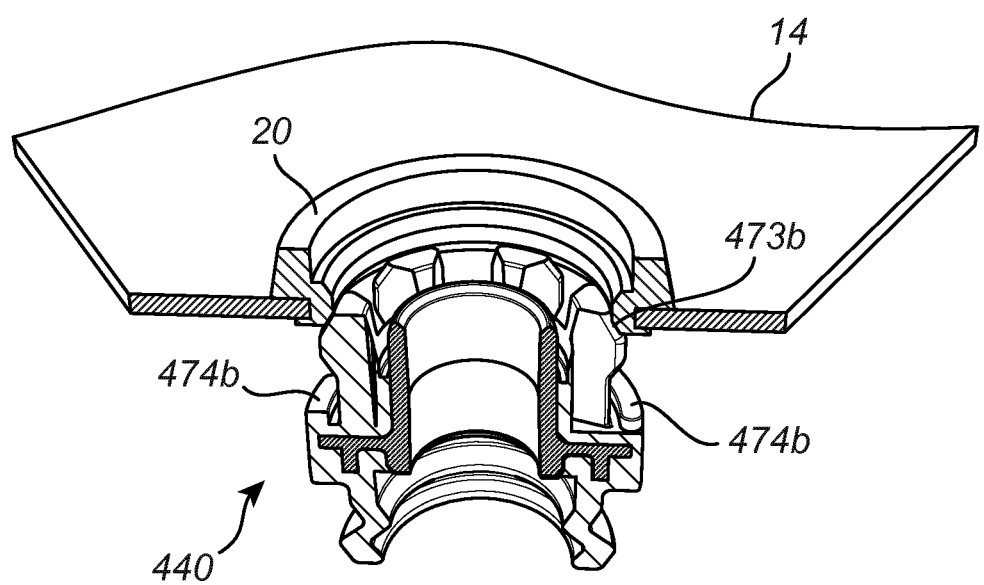

As shown in FIG. 16B, the inner radial dimension of the sleeve is selected such that the distal inclined insertion surfaces 473b of the ribs 477 will guide the damper unit 440 into the opening and also assist in pressing or forcing the elastomeric damper element 470 through the opening.

Figure 16C:
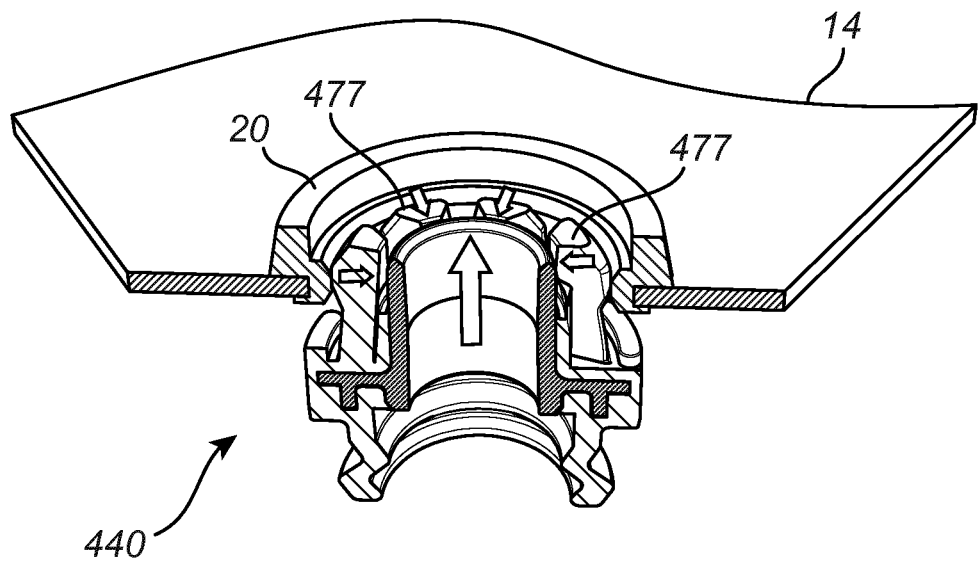

FIG. 16C illustrates how the radial extensions 473 of the ribs 477 will be pressed radially inwards as the damper unit 440 is moved through the opening of the sleeve 20. This radial movement may be possible due to an inwardly radial bending of the distal rib parts 477b and/or due to a radial compression of the extensions 473.

Figure 16D:
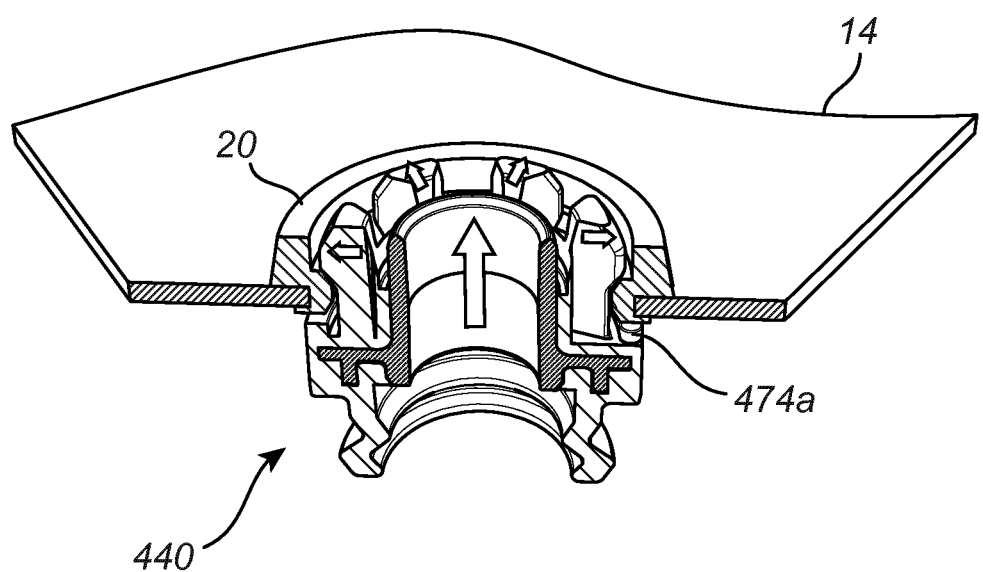

FIG. 16D illustrates the final mounted position of the damper unit 440 in relation to the horn plate 14. The final position is defined by an insertion position where the smaller support studs 474a are brought to engagement with the underside of the sleeve 20. The engagement may also be directly with the rear side of the horn plate 14. When the damper unit 440 has been fully inserted to its final position, the extensions 473 of the ribs 477 will snap radially outwards as shown by arrows in FIG. 16D. The proximal inclined locking surface 473b of each rib 477 will now be in a locking engagement with the upper side of a radial extension of the sleeve 20 to lock the damper unit 440 in place. The damper unit 440 is now held axially in its final position by the elastomeric damper element 470, namely by the smaller support studs 474a on the one hand, and the radial extensions 473 on the other hand. The larger support studs 474b are not in use at this stage.

As described above for the $1^{st}$ embodiment, during insertion of the damper element 470, the radially outer engagement surfaces 475 of the proximal rib parts 477a are brought into engagement with the inner engagement surface 21 of the corresponding sleeve 20, such that steering wheel vibrations V may be transferred from the damper element 470 to the horn plate 14. In order to achieve a proper vibration damping effect, the radial dimensions are preferably selected such that the damper element 470 is somewhat radially pre-compressed between the slider 450 and the inner engagement surface 21 of the sleeve 20 as a result of the insertion.

Figure 16E:
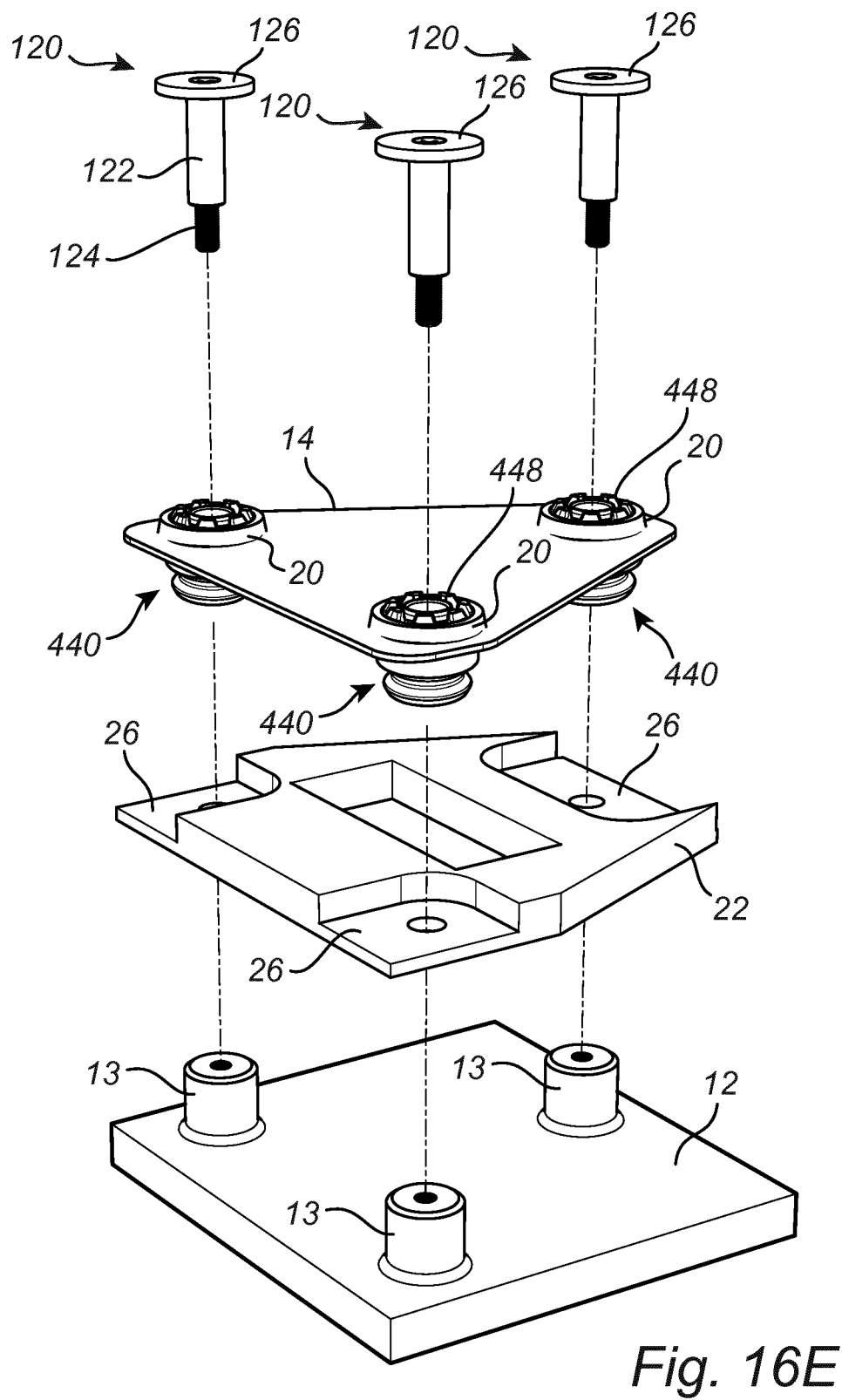

When the damper elements 470 have been correctly positioned in the horn plate 14, a bolt 120 may be inserted into the bore 454 of each slider 450 as shown in FIG. 16E. Each bolt 120 has a bolt head 126, a cylindrical guide shaft 122 and a threaded end 124. The tubular part 452 of the slider 450 may slide along the guide shaft 122. The bolts 120 are secured in bolt holes of the extensions 13 of the base structure 12.

During the final fastening of each bolt 120 (FIG. 16F), a pre-compression of the corresponding horn spring part 494 is obtained. As a non-limiting example, a horn spring part 494 may be pre-compressed from 10 mm to 7 mm during assembly and then further compressed one or a few millimeters upon horn activation. In the final assembly 6, the distal end 495 of each horn spring part 494 engages the associated horn spring support surface 26 of the bracket 22.

Figure 16F:
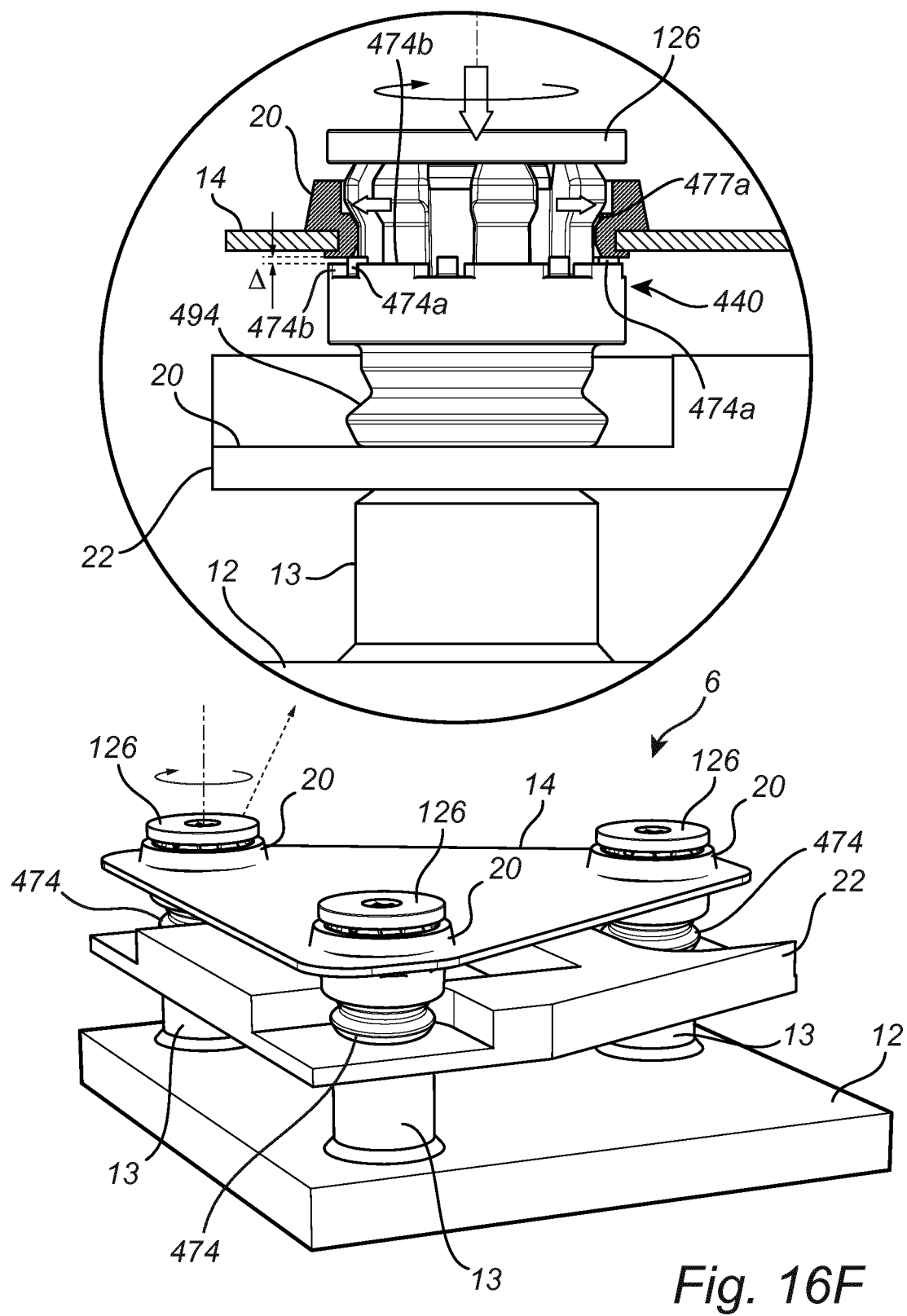

As illustrated in the enlarged-scale view in FIG. 16F, during the final fastening of each bolt 120, the bolt head 126 may engage and axially compress the ribs 477 until the distal ends of the ribs 477 are in level with the distal end of the slider 450. As illustrated with arrows in FIG. 16F, this final compression will lock the radial extensions 473 or the ribs 477 tighter to the sleeve 20 and thereby fix the damper unit 440 even more securely in the axial direction in relation to the horn plate 14. In other embodiments, such a final compression may be dispensed with.

Figure 17A:
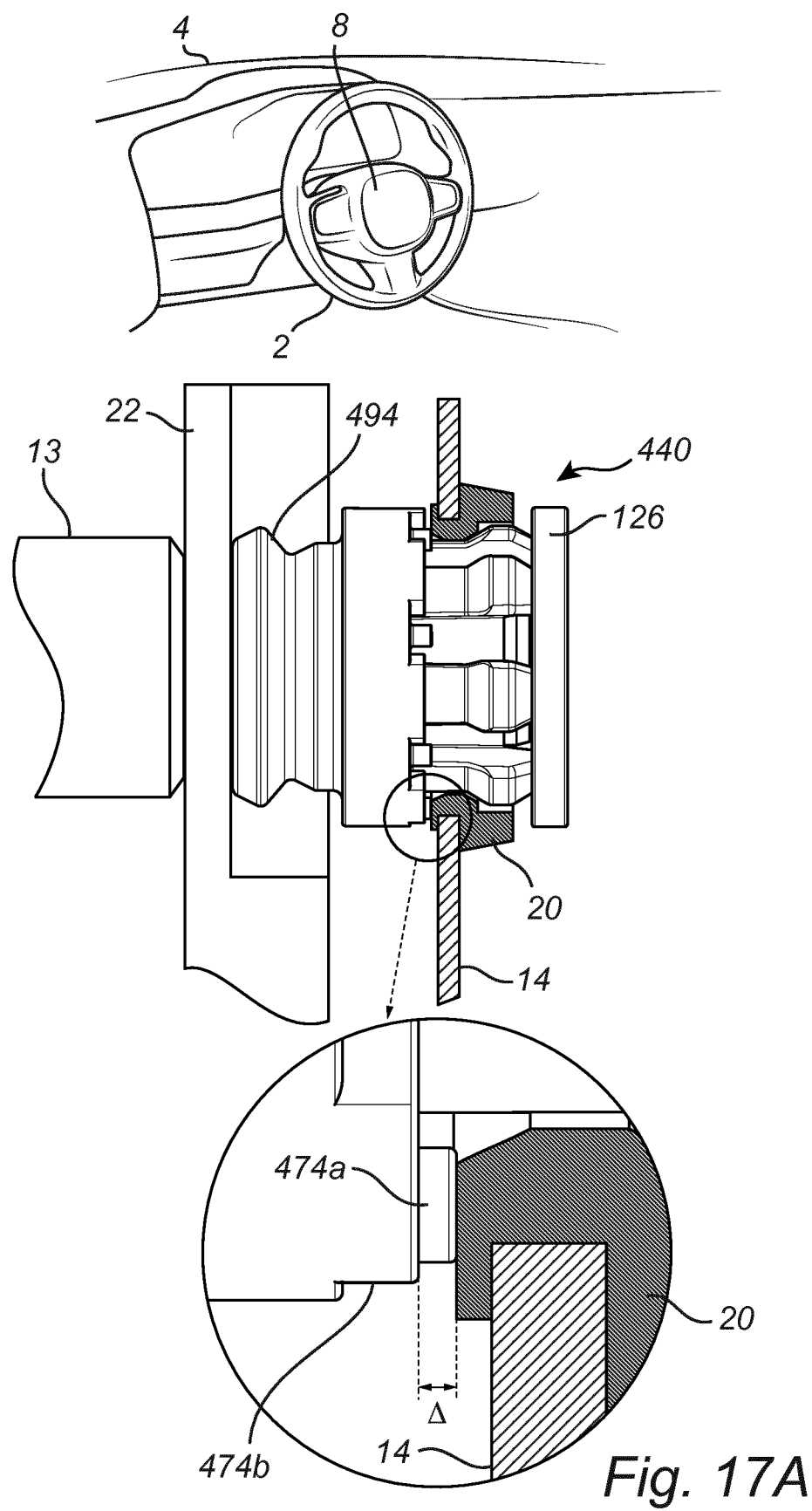
FIGS. 17A to 17C illustrate a horn activation of an assembly including damper units according to the $4^{th}$ embodiment.

The operation of the larger/stiffer support studs 474b will now be described with reference to FIGS. 17A to 17C. Before the driver activates the horn (FIG. 17A), the rear side of each sleeve 20 is in contact with the smaller support studs 474a only, with an axial gap Δ being present between the rear side of the sleeve 20 and the larger support studs 474b.

Figure 17B:
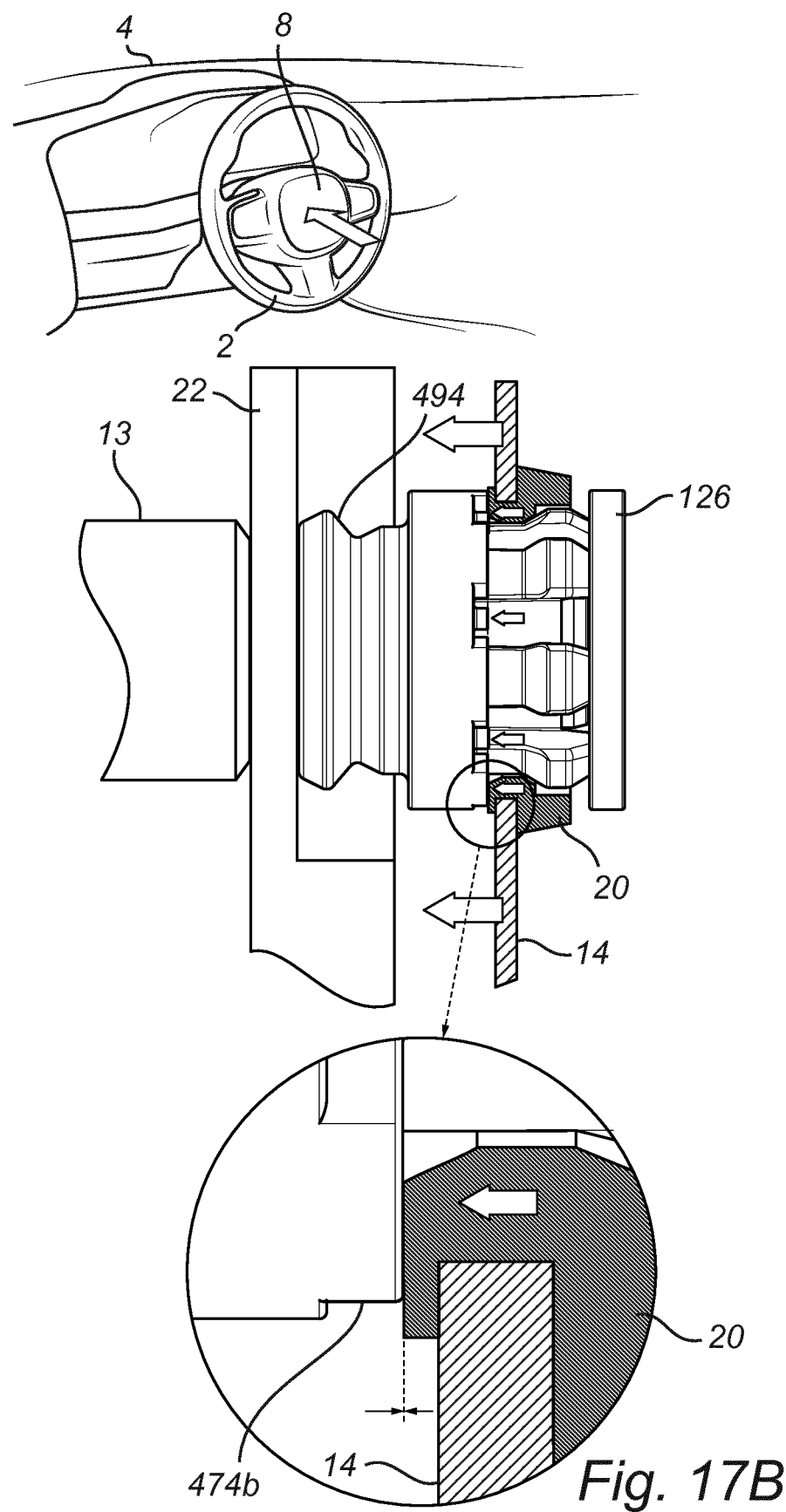

FIG. 17B illustrates an initial stage of horn activation, where the driver has just initiated the horn activation by pressing the horn activation pad 8. The horn plate 14 has now moved axially a distance Δ. The small support studs 474a have been axially compressed due to their relatively small cross-sectional dimension. Therefore, the compression of the horn spring 494 has not yet started. When the small support studs 474a have been axially compressed to a degree where they have the same axial height as the larger support studs 474b, the rear side of the sleeve 20 will have contact with both the smaller support studs 474a and the larger support studs 474b, as shown in the enlarged scale view in FIG. 17B. The distance Δ is now eliminated. Accordingly, selecting small dimensions for the first set of support studs 474a has the advantage of both ensuring a flexible interface and ensuring an axial compression upon horn activation.

Figure 17C:
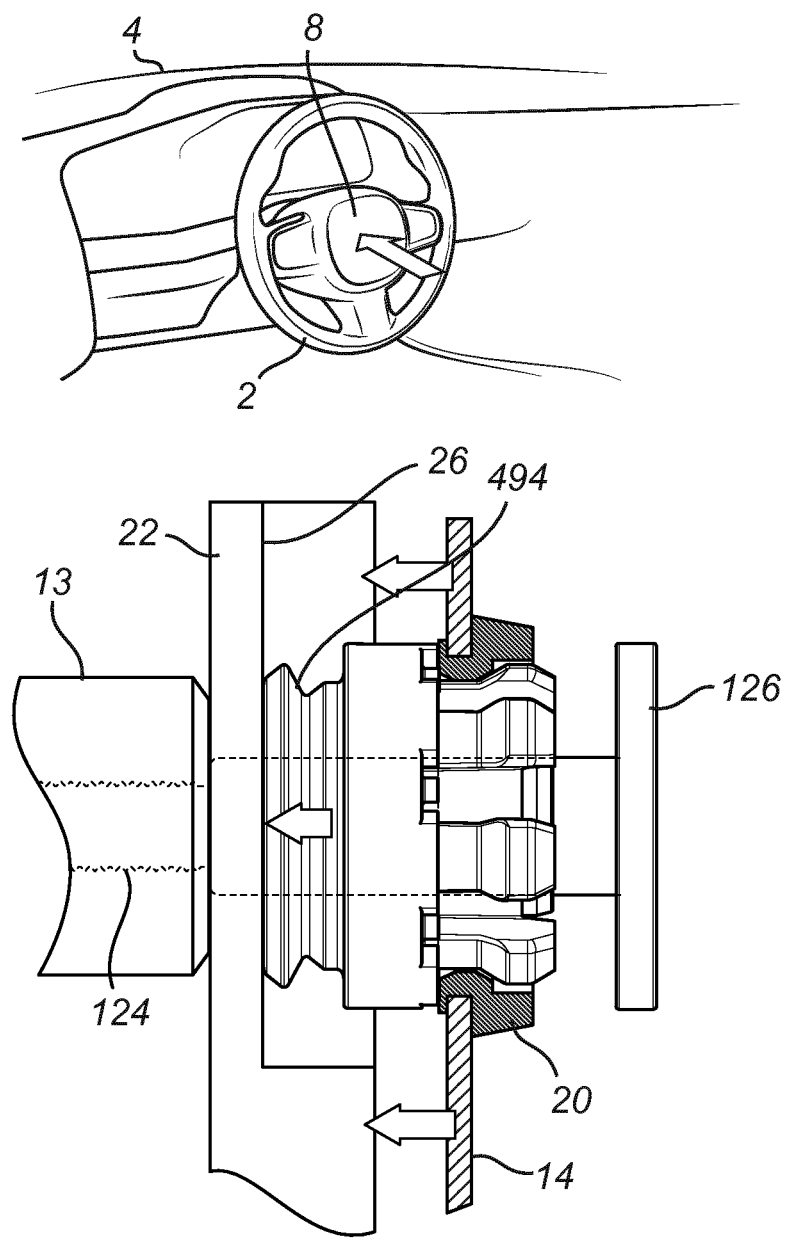

FIG. 17C illustrates the subsequent stage of horn activation. When the distance Δ towards the larger support studs 474b has been eliminated, the total axial stiffness of all the support studs 474a and 474b in combination will now be sufficient for the horn spring part 494 to be compressed when the driver presses the horn activation pad 8. For illustration purposes only, FIG. 17C shows the movement of the horn plate 14 and the compression of the horn spring in a very exaggerated scale. In reality, this movement may be in the order of one or few millimeters only.

A specific advantage obtained by this design including support studs 474a and 474b with different heights, and optionally with different axial stiffness, is that two advantageous properties may be obtained at the same time, one relating to the vibration damping and one relating to horn activation. With regard to vibration damping, a radially flexible interface is preferred between the elastomeric material and the rear side of the sleeve 20 or horn plate 14. With regard to horn activation, an axially stiff interface is preferred at the same location in order to initiate the horn spring compression as soon as possible when the driver presses the pad 8. This "dilemma" is solved by providing the different support studs 474a and 474b, creating a "dynamic" support interface.

On the one hand, when no horn activation is present, the rear side of the horn plate 14 is supported by the relatively flexible smaller support studs 474a only. This has the advantage that the interface between the elastomeric material and the rear side of the horn plate 14 does not interfere with the vibration damping function. The larger support studs 474b are inactive when no horn activation is present. On the other hand, when horn activation is initiated, it is preferred that a fully developed horn spring force is obtained as soon as possible. Thanks to the presence of the larger and relatively stiff support studs 474b, and the relatively low axial stiffness of the smaller support studs 474a, the distance Δ can be very quickly eliminated when horn activation is initiated by axially compression of the smaller support studs 474a, such that the desired axially stiff interface can be established despite that the interface is flexible during normal vibration damping.

Alternatives

The embodiments described above and as shown in the figures may be varied in many ways.

In the illustrated embodiments, the guide shaft is part of a bolt screwed into the vibrating base structure. The guide shaft may be implemented differently, for instance by a guide shaft made in one piece with the vibrating structure and optionally with a free threaded end for securing the assembly by a nut. Also, it may in some embodiments be possible to have the bolt oriented the opposite direction, i.e. to be screwed into the horn plate instead.

In alternative embodiments, the sleeves 20 of the horn plate are dispensed with and the damper elements are connected to the horn plate 14 in a different way, optionally in direct contact with the horn plate 14.

The second tubular portion of the slider may in other embodiments extend further into the horn spring part, but preferably not all the way in order to allow movement of the slider upon horn activation. In some embodiment, the second tubular portion is dispensed with and the horn spring element is attached to the slider in some other way, such as to the flange only.

In some embodiments, the outer engagement surface of the damper element may extend substantially 360 degrees circumferentially around the axis of the damper unit, such that vibrations may be transferred in essentially all radial directions. Such embodiments are considered to include ribbed designs also, where the outer engagement surface is not continuous in the circumferential direction.

In other embodiments, the outer engagement surface of the damper element may be present in some directions only if the damper unit is configured to transfer vibrations in some specific directions only. This may be implemented in various ways, such as by arranging inner protruding parts in the mounting opening of the horn plate defining circumferentially limited inner engagement surfaces, such as inner protruding parts on the sleeves. This may also be implemented by designing the elastomeric damper element with engagement surfaces in some directions only. In such embodiments where one single damper unit is arranged to transfer vibrations in specific directions only, the complete assembly may comprise a number of damper units arranged to handle vibrations in different directions. As an example, One or more damper units may be configured to dampen vibrations in a vertical direction and one or more other damper units may be configured to dampen vibrations in a horizontal direction.

In alternative embodiments, the slider and the corresponding channels or bores of the elastomeric elements may have a non-circular cross-section, for instance if different damping properties in different directions are desired and the damper unit therefore has to be oriented in a specific way on the guide shaft.

The invention claimed is:

1. A damper unit for use in a vibration-reducing assembly for a steering wheel, said damper unit comprising:
    a slider having a central bore extending along an axis, said slider being configured, upon horn activation on the steering wheel, to slide in a direction of said axis on a guide shaft received in said central bore;
    a damper element which is made from an elastomeric material and is molded on a first part of the slider; and
    a molded horn spring element which is made from an elastomeric material and comprises a horn spring part and an attachment part molded in one piece and molded in one piece with the damper element, wherein the attachment part of the horn spring element is molded on a second part of the slider, and wherein the horn spring part is configured to exert a force on the slider in the direction of the axis; and
    wherein the damper element is molded on an outer surface of the slider to overlap the slider along the axis.

2. The damper unit as claimed in claim 1, wherein the attachment part of the horn spring element is mechanically bonded to the slider.

3. A damper unit for use in a vibration-reducing assembly for a steering wheel, said damper unit comprising:
    a slider having a central bore extending along an axis, said slider being configured, upon horn activation on the steering wheel, to slide in a direction of said axis on a guide shaft received in said central bore;
    a damper element which is made from an elastomeric material and is molded on a first part of the slider; and
    a molded horn spring element which is made from an elastomeric material and comprises a horn spring part and an attachment part molded in one piece and molded in one piece with the damper element, wherein the attachment part of the horn spring element is molded on a second part of the slider, wherein the horn spring part is configured to exert a force on the slider in the direction of the axis; and
    wherein the attachment part of the horn spring element is mechanically bonded to the slider by one or more molded locking elements, which are molded in one piece with the horn spring element and the damper element, and which are in mechanical locking engagement with associated one or more locking openings in the slider.

4. The damper unit as claimed in claim 3, wherein the slider comprises:

a tubular element extending along said axis and including said central bore; and a flange extending radially outwards from the tubular element and including said locking openings in the form of through-holes;

wherein the damper element and the horn spring element are located on opposite axial sides of the flange; and wherein the damper element, the horn spring element and the locking elements are molded in one piece such that the damper element and the horn spring element are mechanically bonded to the slider via the locking elements extending through the locking openings of the flange.

5. The damper unit as claimed in claim 4, wherein the horn spring part of the horn spring element extends at least in part axially beyond the slider.

6. The damper unit as claimed in claim 3, wherein the horn spring part of the horn spring element extends at least in part axially beyond the slider.

7. The damper unit as claimed in claim 3, wherein the horn spring part is at least partly bellows-shaped.

8. The damper unit as claimed in claim 2, wherein the horn spring part of the horn spring element extends at least in part axially beyond the slider.

9. The damper unit as claimed in claim 2, wherein the horn spring part is at least partly bellows-shaped.

10. The damper unit as claimed in claim 1, wherein the horn spring part of the horn spring element extends at least in part axially beyond the slider.

11. The damper unit as claimed in claim 1, wherein the horn spring part is at least partly bellows-shaped.

12. The damper unit as claimed in claim 1, wherein the attachment part of the horn spring element is chemically bonded to the slider.

13. The damper unit as claimed in claim 1, wherein the damper element is at least one of mechanically or chemically bonded to the slider.

14. A vibration-reducing assembly for dampening vibrations in a steering wheel, comprising:
  a base structure which is fixed to the steering wheel and presents vibrations to be dampened;
  a guide shaft fixed to the base structure;
  a damper unit comprising:
    a slider having a central bore extending along an axis, said slider being configured, upon horn activation on the steering wheel, to slide in a direction of said axis on a guide shaft received in said central bore;
    a damper element which is made from an elastomeric material and is molded on a first part of the slider; and
    a molded horn spring element which is made from an elastomeric material and comprises a horn spring part and an attachment part molded in one piece and molded in one piece with the damper element, wherein the attachment part of the horn spring element is molded on a second part of the slider, and wherein the horn spring part is configured to exert a force on the slider in the direction of the axis;
  wherein the guide shaft is slidably received in the central bore of the slider, and wherein the horn spring part of the damper unit is configured, upon horn activation on the steering wheel, to be compressed in response to the slider moving along the axis of the damper unit towards the base structure; and
  a mass which is supported by the base structure via the damper element of the damper unit for allowing movement of the mass perpendicular to said axis;
  wherein the damper element of the damper unit is configured to transfer vibrations, directed perpendicular to said axis, from the steering wheel to the mass; and
  wherein the damper element and the mass are configured to operate as a spring-mass system forming a frequency-tuned dynamic damper for dampening said vibrations in the base structure and the steering wheel.

15. The vibration-reducing assembly as claimed in claim 14, wherein a weight of the mass comprises at least a weight of a horn plate and a weight of an airbag assembly supported by the horn plate; and wherein the horn plate is supported by the elastomeric damper element of the damper unit.

16. The vibration-reducing assembly as claimed in claim 15, wherein the damper element of the damper unit is received in a mounting opening of the horn plate, and wherein the damper element includes an outer engagement surface, which is in engagement with an inner engagement surface of a mounting opening of the horn plate for transferring said vibrations.

17. The vibration-reducing assembly as claimed in claim 16, wherein the damper element of the damper unit includes a plurality of mutually spaced ribs, said ribs together forming the outer engagement surface of the damper element.

18. The vibration-reducing assembly as claimed in claim 14, wherein the guide shaft is part of a threaded bolt, and
  wherein a bolt head of the bolt is configured to act as a stop for limiting movement of the slider in one direction.

19. A method for manufacturing a damper unit as claimed in claim 1, the method comprising:
  providing the slider having the central bore extending along the axis of the damper unit;
  providing the damper element on the first part of the slider;
  providing the horn spring element comprising the horn spring part and the attachment part molded in one piece, wherein the attachment part is molded on the second part of the slider;
  wherein providing the damper element and providing the horn spring element comprise molding the damper element and the horn spring element in one piece on the slider from the elastomeric material.

20. A method for manufacturing a damper unit for use in a vibration-reducing assembly for a steering wheel, said damper unit including a slider having a central bore extending along an axis, said slider being configured, upon horn activation on the steering wheel, to slide in a direction of said axis on a guide shaft received in said central bore, a damper element, and a molded horn spring element which is made from an elastomeric material and includes a horn spring part and an attachment part, wherein the horn spring part is configured to exert a force on the slider in the direction of the axis, the method comprising:
  providing the slider having the central bore extending along the axis of the damper unit
  providing the damper element on the first part of the slider; and
  providing the horn spring element comprising the horn spring part and the attachment part molded in one piece, wherein the attachment part is molded on the second part of the slider,
  wherein providing the damper element and providing the horn spring element comprise molding the damper element and the horn spring element in one piece on the slider from the elastomeric material;
  wherein the slider comprises a tubular element extending along said axis, and a flange extending radially outwards from the tubular element and including one or more locking openings in the form of through-holes; and wherein molding the damper element and the horn spring element in one piece comprises molding the damper element and the horn spring element on axially opposite sides of the flange and with one or more locking elements, said locking elements extending through said locking openings, thereby mechanically bonding the damper element and the horn spring element to the slider.

21. The damper unit as claimed in claim 1, wherein the slider has an outer peripheral surface, the first part of the slider is a first part of the outer peripheral surface, and the second part of the slider is a second part of the outer peripheral surface.

22. The method for manufacturing as claimed in claim 19, wherein the slider had an outer peripheral surface, the first part of the slider is a first part of the outer peripheral surface, and the second part of the slider is a second part of the outer peripheral surface.

\* \* \* \* \*